US011650693B2

(12) United States Patent
Lee

(10) Patent No.: US 11,650,693 B2
(45) Date of Patent: May 16, 2023

(54) DISPLAY DEVICE SENSING SIMULTANEOUS INPUTS FROM A PLURALITY OF INPUT DEVICES

(71) Applicant: SAMSUNG DISPLAY CO., LTD., Yongin-si (KR)

(72) Inventor: Soongyu Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/467,640

(22) Filed: Sep. 7, 2021

(65) Prior Publication Data

US 2022/0236850 A1  Jul. 28, 2022

(30) Foreign Application Priority Data

Jan. 28, 2021 (KR) .................. 10-2021-0012628

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05); *G06F 3/04162* (2019.05); *G06F 3/0412* (2013.01); *G06F 2203/04104* (2013.01); *G06F 2203/04106* (2013.01)

(58) Field of Classification Search
CPC .............. G06F 3/04166; G06F 3/0446; G06F 3/04162; G06F 3/0412; G06F 2203/04104; G06F 2203/04106
See application file for complete search history.

(56) References Cited

U.S. PATENT DOCUMENTS

| 10,037,093 | B2 | 7/2018 | Yamamoto | |
|---|---|---|---|---|
| 10,310,640 | B2 | 6/2019 | Lee et al. | |
| 10,955,964 | B2 | 3/2021 | Jung et al. | |
| 2019/0102021 | A1* | 4/2019 | Jang | G06F 3/0383 |
| 2020/0326805 | A1* | 10/2020 | Lee | G06F 3/0412 |

FOREIGN PATENT DOCUMENTS

| KR | 10-1659036 | 9/2016 |
|---|---|---|
| KR | 1020170113577 | 10/2017 |
| KR | 1020200077344 | 6/2020 |

* cited by examiner

*Primary Examiner* — Lisa S Landis
(74) *Attorney, Agent, or Firm* — F. Chau & Associates, LLC

(57) ABSTRACT

A display device includes a display panel, an input sensor disposed on the display panel and including a plurality of first sensing electrodes and a plurality of second sensing electrodes, and a sensor controller configured to control the input sensor. The sensor controller receives a first signal from the input sensor and transmits a second signal to the input sensor. The first signal received from the input sensor includes down-link signals from first sensing electrodes corresponding to a first input position and a second input position among the plurality of first sensing electrodes and down-link signals from second sensing electrodes corresponding to the first input position and the second input position among the plurality of second sensing electrodes. The first input position corresponding to a first input source, and the second input position corresponding to a second input source, are spaced apart from each other.

19 Claims, 17 Drawing Sheets

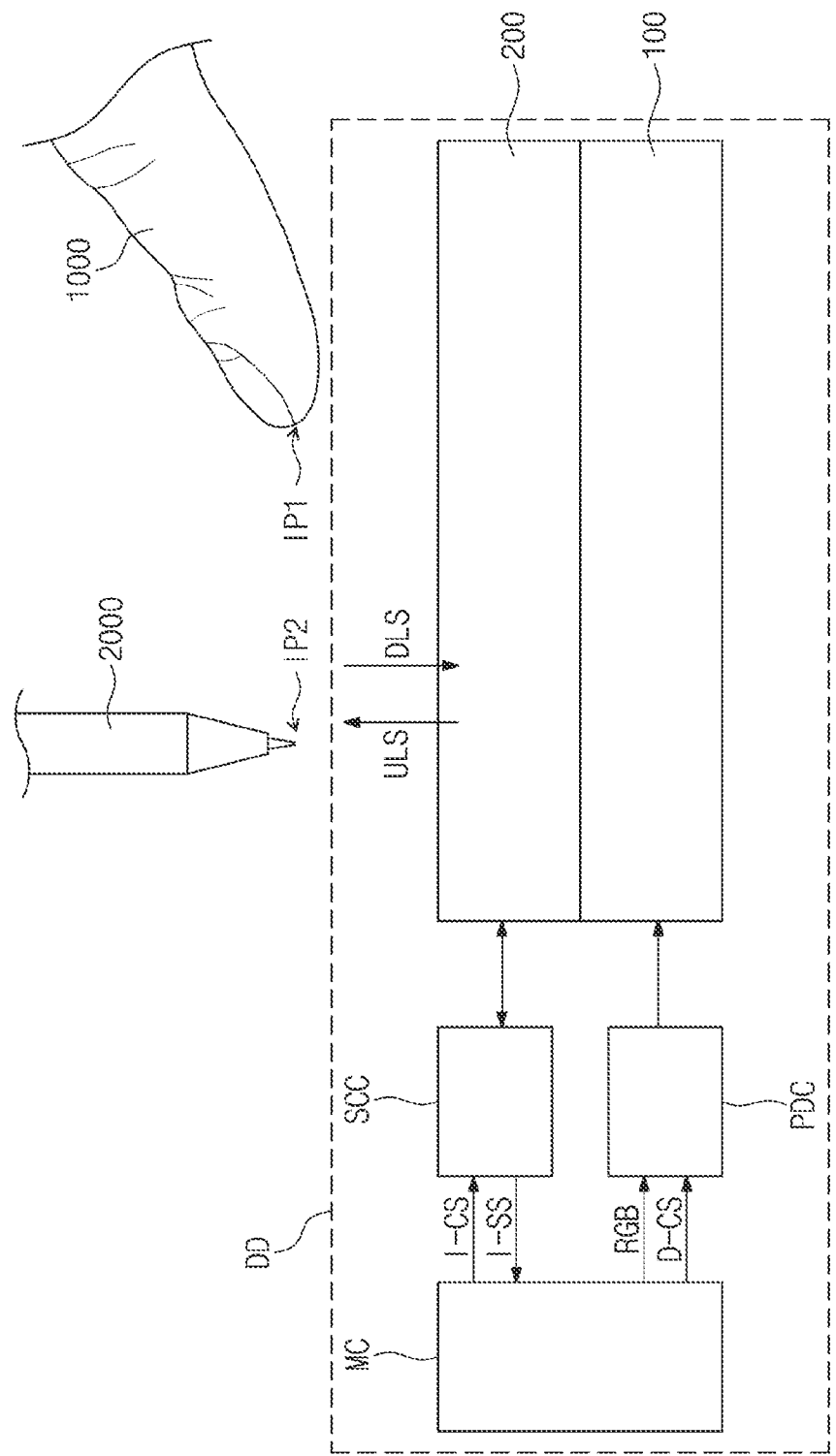

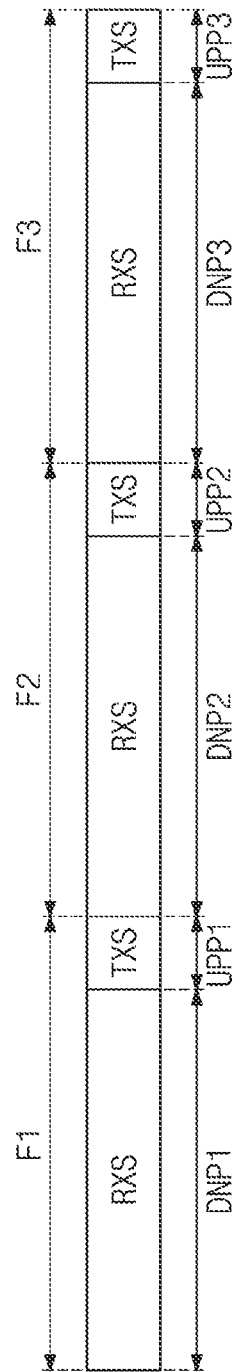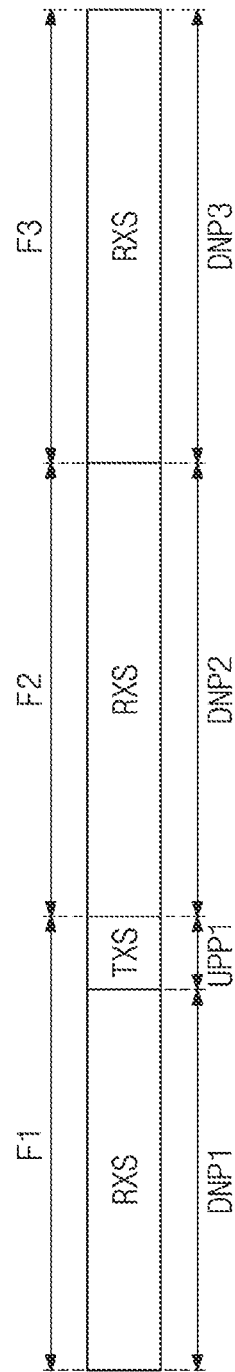

DISPLAY DEVICE SENSING SIMULTANEOUS INPUTS FROM A PLURALITY OF INPUT DEVICES

CROSS-REFERENCE TO RELATED APPLICATIONS

This U.S. non-provisional patent application claims priority under 35 U.S.C. § 119 to Korean Patent Application No. 10-2021-0012628, filed on Jan. 28, 2021, the disclosure of which is hereby incorporated by reference in its entirety.

TECHNICAL FIELD

Embodiments of the present disclosure relate to a display device.

DISCUSSION OF RELATED ART

Multimedia electronic devices such as televisions, mobile phones, tablets, computers, navigation system units, and game consoles may be equipped with a display device for displaying images. Such electronic devices may include a display device that provides a touch-based input method, which allows a user to intuitively and conveniently input information or commands in addition to a typical input method such as a physical button, a keyboard, and a mouse. Personal electronic devices such as a mobile phone may sense not only a touch, but also an input of an electronic pen.

SUMMARY

Embodiments of the present disclosure provide a display device capable of sensing inputs from a plurality of input devices.

An embodiment of the inventive concept provides a display device including a display panel, an input sensor disposed on the display panel and including a plurality of first sensing electrodes and a plurality of second sensing electrodes insulated from the plurality of first sensing electrodes, and a sensor controller configured to control the input sensor. The sensor controller receives a first signal from the input sensor and transmits a second signal to the input sensor. The first signal received from the input sensor includes a first plurality of down-link signals from first sensing electrodes corresponding to a first input position and a second input position among the plurality of first sensing electrodes and a second plurality of down-link signals from second sensing electrodes corresponding to the first input position and the second input position among the plurality of second sensing electrodes. The first input position, which corresponds to a first input applied by a first input source, and the second input position, which corresponds to a second input applied by a second input source, are spaced apart from each other on the input sensor.

In an embodiment, the second signal transmitted to the input sensor may include a first up-link signal to be transmitted to a second sensing electrode corresponding to the first input position among the plurality of second sensing electrodes and a second up-link signal to be transmitted to a second sensing electrode corresponding to the second input position among the plurality of second sensing electrodes.

In an embodiment, the sensor controller may transmit the second signal to two or more second sensing electrodes corresponding to the first input position among the plurality of second sensing electrodes and to two or more second sensing electrodes corresponding to the second input position among the plurality of second sensing electrodes.

In an embodiment, the second signal transmitted to the input sensor may include a first up-link signal to be transmitted to a first sensing electrode corresponding to the first input position among the plurality of first sensing electrodes and a second up-link signal to be transmitted to a first sensing electrode corresponding to the second input position among the plurality of first sensing electrodes.

In an embodiment, the second sensing electrodes corresponding to the first input position among the plurality of second sensing electrodes and the second sensing electrodes corresponding to the second input position among the plurality of second sensing electrodes may overlap each other.

In an embodiment, the sensor controller may transmit the second signal to two or more first sensing electrodes corresponding to the first input position among the plurality of first sensing electrodes and to two or more first sensing electrodes corresponding to the second input position among the plurality of first sensing electrodes.

In an embodiment, the sensor controller may receive the first signal from the input sensor during a first period, and may transmit the second signal to the input sensor during a second period consecutive to the first period. The first period may be earlier in time than the second period.

In an embodiment, the duration of the first period may be longer than the duration of the second period.

In an embodiment, the first input applied at the first input position by the first input source and the second input applied at the second input position by the second input source may occur substantially simultaneously.

In an embodiment, the second signal transmitted to the input sensor may include a signal that requests a change in a frequency of at least one of the first input source and the second input source.

In an embodiment, the sensor controller may include a first transmission/reception circuit electrically connected to the plurality of first sensing electrodes, a second transmission/reception circuit electrically connected to the plurality of second sensing electrodes, and a control circuit configured to control the first transmission/reception circuit and the second transmission/reception circuit.

In an embodiment, the first transmission/reception circuit may provide the plurality of first down-link signals from the first sensing electrodes corresponding to the first input position and the second input position among the plurality of first sensing electrodes to the control circuit, and the second transmission/reception circuit may provide the second plurality of down-link signals from the second sensing electrodes corresponding to the first input position and the second input position among the plurality of second sensing electrodes to the control circuit.

In an embodiment of the inventive concept, a display device includes a display panel, an input sensor disposed on the display panel and including a plurality of first sensing electrodes and a plurality of second sensing electrodes insulated from the plurality of first sensing electrodes, and a sensor controller configured to control the input sensor. The sensor controller receives a first signal from the input sensor during a first period of a first frame, and transmits a second signal to the input sensor during a second period of the first frame. The sensor controller receives the first signal from the input sensor during a second frame consecutive to the first frame. The first signal received from the input sensor includes a first plurality of down-link signals from first sensing electrodes corresponding to a first input position and a second input position among the plurality of first sensing electrodes and a second plurality of down-link signals from second sensing electrodes corresponding to the first input position and the second input position among the plurality of second sensing electrodes. The first input position, which corresponds to a first input applied by a first input source, and the second input position, which corresponds to a second input applied by a second input source, are spaced apart from each other.

In an embodiment, the second signal transmitted to the input sensor during the second period of the first frame may include a first up-link signal to be transmitted to a second sensing electrode corresponding to the first input position among the plurality of second sensing electrodes and a second up-link signal to be transmitted to a second sensing electrode corresponding to the second input position among the plurality of second sensing electrodes.

In an embodiment, the sensor controller may transmit, during the second period of the first frame, the second signal to two or more second sensing electrodes corresponding to the first input position among the plurality of second sensing electrodes and to two or more second sensing electrodes corresponding to the second input position among the plurality of second sensing electrodes.

In an embodiment, the second signal transmitted to the input sensor during the second period of the first frame may include a first up-link signal to be transmitted to a first sensing electrode corresponding to the first input position among the plurality of first sensing electrodes and a second up-link signal to be transmitted to a first sensing electrode corresponding to the second input position among the plurality of first sensing electrodes.

In an embodiment, the second sensing electrodes corresponding to the first input position among the plurality of second sensing electrodes and the second sensing electrodes corresponding to the second input position among the plurality of second sensing electrodes may overlap each other.

In an embodiment, the sensor controller may transmit the second signal to two or more first sensing electrodes corresponding to the first input position among the plurality of first sensing electrodes and to two or more first sensing electrodes corresponding to the second input position among the plurality of first sensing electrodes.

In an embodiment, the first period may be earlier in time than the second period, and the duration of the first period may be longer than the duration of the second period.

In an embodiment, the second signal transmitted to the input sensor during the second period of the first frame may include a signal that requests a change in a frequency of at least one of the first input source and the second input source.

In an embodiment, the sensor controller may include a first transmission/reception circuit electrically connected to the first sensing electrodes, a second transmission/reception circuit electrically connected to the second sensing electrodes, and a control circuit configured to control the first transmission/reception circuit and the second transmission/reception circuit.

BRIEF DESCRIPTION OF THE DRAWINGS

The above and other features of the present inventive concept will become more apparent by describing in detail embodiments thereof with reference to the accompanying drawings, in which:

FIG. 3 is a view for describing an operation between a display device and an input device according to an embodiment of the inventive concept;

FIGS. 13A and 13B are conceptual views of a pen sensing mode according to an embodiment of the inventive concept.

DETAILED DESCRIPTION

Figure 1:
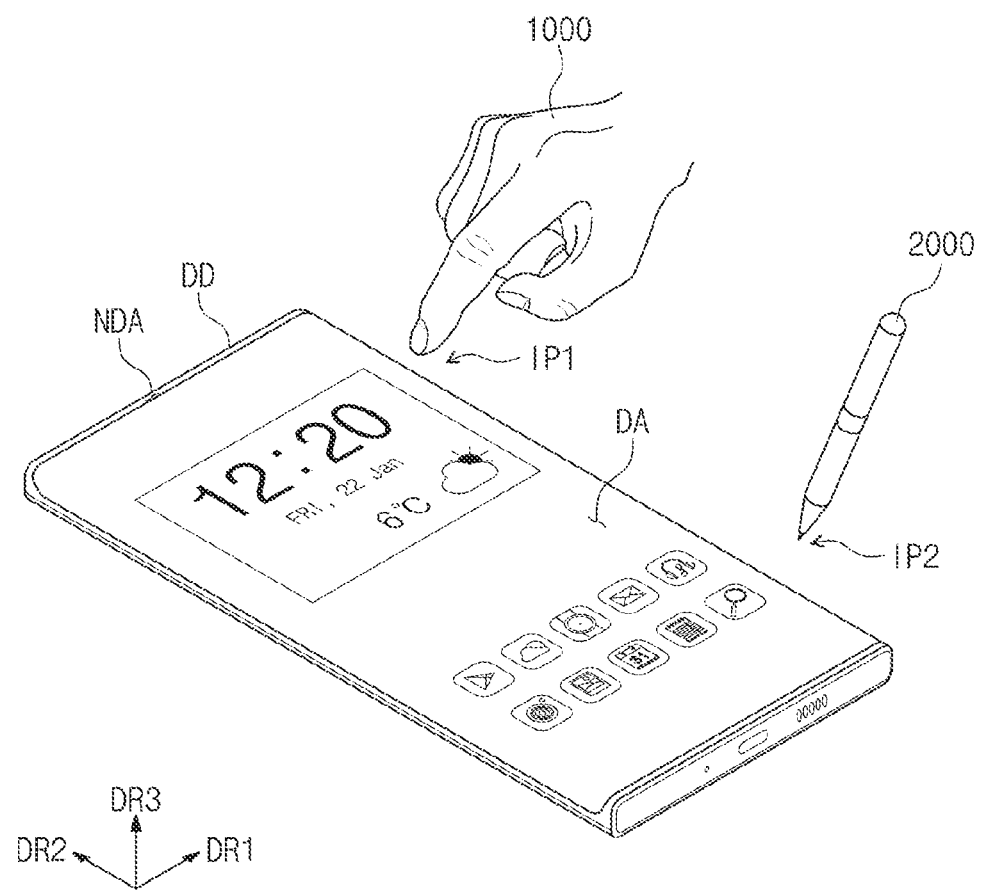
FIG. 1 is a perspective view of a display device according to an embodiment of the inventive concept.

Embodiments of the present inventive concept will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The term "and/or" includes all combinations of one or more of which associated configurations may define.

It will be understood that, although the terms "first", "second", etc. may be used herein to describe various elements, these elements should not be limited by these terms. These terms are only used to distinguish one element from another. For example, a first element may be referred to as a second element, and a second element may also be referred to as a first element in a similar manner without departing the scope of the inventive concept. The terms of a singular form may include plural forms unless the context clearly indicates otherwise.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Herein, when two or more processes or events are described as occurring substantially simultaneously, it is to be understood that the processes or events may be performed at or may occur at exactly the same time, or at about the same time as would be understood by a person having ordinary skill in the art. For example, the processes or events may be performed at or may occur at about the same time within a measurement error as would be understood by a person having ordinary skill in the art.

It will be further understood that when two components or directions are described as extending substantially parallel or perpendicular to each other, the two components or directions extend exactly parallel or perpendicular to each other, or extend approximately parallel or perpendicular to each other within a measurement error as would be understood by a person having ordinary skill in the art.

FIG. 1 is a perspective view illustrating a display device DD according to an embodiment of the inventive concept.

Referring to FIG. 1, the display device DD may be a device activated according to an electrical signal. For example, the display device DD may be a mobile phone, a tablet computer, a car navigation system unit, a game console, or a wearable device, etc. However, the display device DD is not limited thereto. In FIG. 1, the display device DD is exemplarily illustrated as a mobile phone (e.g., a smartphone).

The display device DD may have an active region DA and a peripheral region NDA. The display device DD may display an image in the active region DA. The active region DA may include a plane defined by a first direction DR1 and a second direction DR2. The peripheral region NDA may surround the active region DA.

The thickness direction of the display device DD may correspond to a third direction DR3 intersecting the first direction DR1 and the second direction DR2. Therefore, a front surface (or an upper surface) and a rear surface (or a lower surface) of members constituting the display device DD may be defined on the basis of the third direction DR3 (e.g., the thickness direction of the display device DD).

The display device DD may sense inputs applied from outside of the display device DD. For example, the display device DD may sense a first input IP1 by a first input source 1000 and a second input IP2 by a second input source 2000. The first input source 1000 may include all input sources capable of bringing a change in capacitance, such as a user's body and a passive pen. The second input source 2000 is an active-type input source capable of providing a driving signal, such as an active pen (or an electronic pen).

The display device DD and the second input source 2000 may communicate in a bidirectional manner. The display device DD may provide an up-link signal to the second input source 2000. The second input source 2000 may provide a down-link signal to the display device DD.

Figure 2:
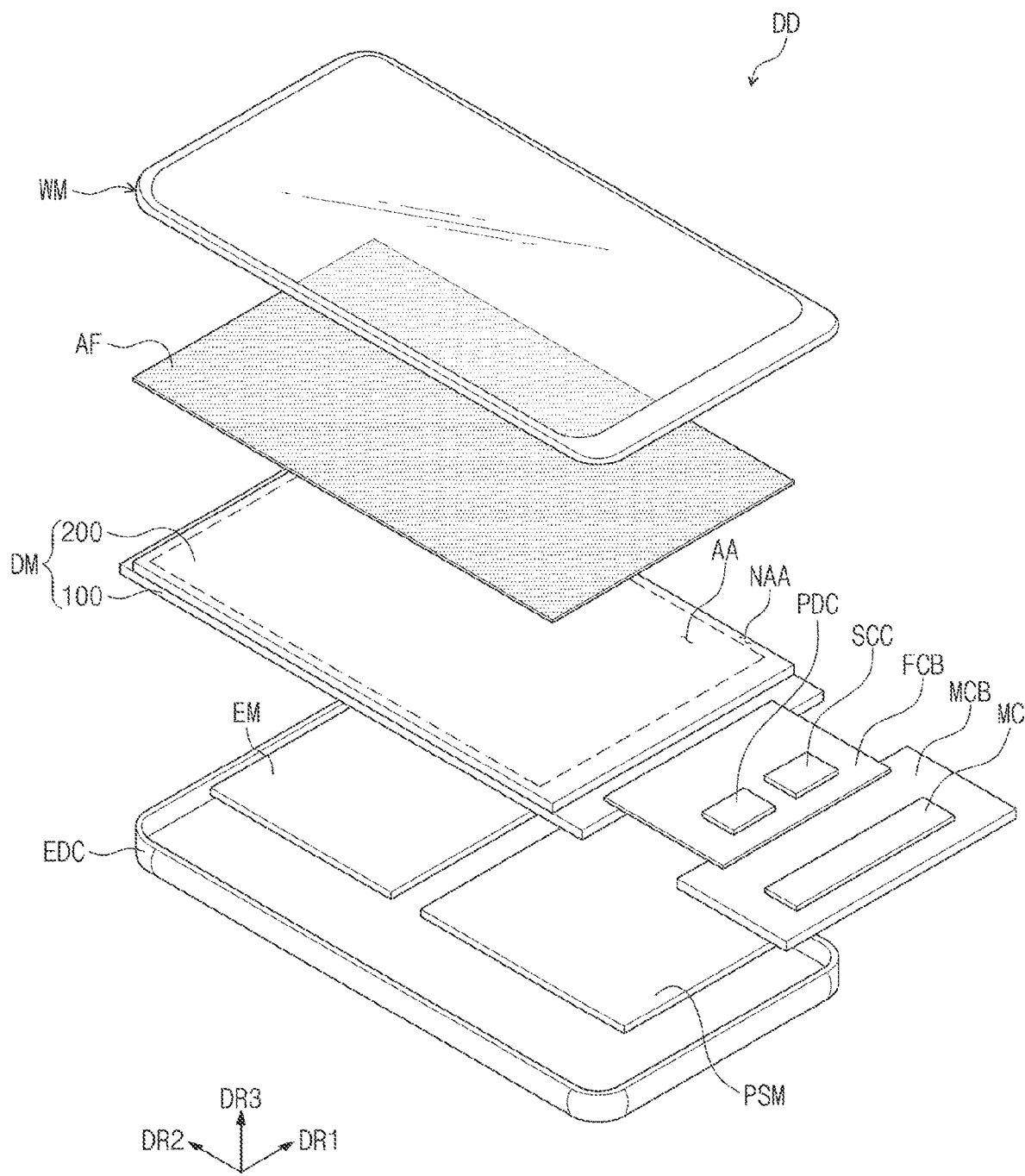
FIG. 2 is an exploded perspective view of a display device according to an embodiment of the inventive concept.

FIG. 2 is an exploded perspective view illustrating the display device DD according to an embodiment of the inventive concept.

As illustrated in FIG. 2, the display device DD may include a display module DM, an optical member AF, a window WM, an electronic module EM, a power module PSM, and a case EDC.

The display module DM generates an image and senses an external input. The display module DM may include a display panel 100 and an input sensor 200. The display module DM includes an active region AA and a peripheral region NAA respectively corresponding to the active region DA (refer to FIG. 1) and the peripheral region NDA (refer to FIG. 1) of the display device DD. For example, the size and shape of the active region AA may correspond to the size and shape of the active region DA, and the size and shape of the peripheral region NAA may correspond to the size and shape of the peripheral region NDA.

The display panel 100 is not particularly limited, and may be, for example, a light emitting-type display panel such as an organic light emitting display panel or a quantum dot light emitting display panel. The input sensor 200 will be described in detail below.

The display module DM may include a main circuit board MCB, a flexible circuit film FCB, a panel driving circuit PDC, and a sensor controller SCC. Any one or more of these components may be omitted in some embodiments. The main circuit board MCB may be connected to the flexible circuit film FCB to be electrically connected to the display panel 100. The main circuit board MCB may include a plurality of driving elements. The plurality of driving elements may include the display panel 100 and a main controller MC that drives the sensor controller SCC. The flexible circuit film FCB is connected to the display panel 100 to electrically connect the display panel 100 and the main circuit board MCB. The panel driving circuit PDC and the sensor controller SCC may be mounted on the flexible circuit film FCB.

The flexible circuit film FCB may be bent to allow the main circuit board MCB to face the rear surface of the display device DD. The main circuit board MCB may be electrically connected to the electronic module EM through a connector.

The panel driving circuit PDC may be electrically connected to the display panel 100 to control the display panel 100. The sensor controller SCC may be electrically connected to the input sensor 200 to control the input sensor 200.

In an embodiment, each of the panel driving circuit PDC and the sensor controller SCC may be formed as an integrated circuit and mounted on the printed circuit board FCB. In an embodiment, the panel driving circuit PDC and the sensor controller SCC may be formed as one integrated circuit. The panel driving circuit PDC may be referred to as a driving controller, a timing controller, a signal generating circuit, or the like, and the sensor controller SCC may be referred to as an input driving circuit, a sensor driving circuit, or a touch driving circuit.

In an embodiment, the input sensor 200 may be electrically connected to the main circuit board MCB through an additional flexible circuit film. However, embodiments of the inventive concept are not limited thereto. In an embodiment, the input sensor 200 may be electrically connected to the display panel 100, and may be electrically connected to the main circuit board MCB through the flexible circuit film FCB.

The optical member AF lowers the reflectance of external light. The optical member AF may include a polarizer and a retarder. The polarizer and the retarder may be of a stretched type or a coated type. The coated-type optical film has an optical axis defined according to the stretching direction of a functional film. The coated-type optical film may include liquid crystal molecules arranged on a base film.

In an embodiment of the inventive concept, the optical member AF may be omitted, and the display module DM may further include a color filter and a black matrix substituting for the optical member AF.

The window WM provides an outer surface of the display device DD. The window WM includes a base substrate, and may further include functional layers such as a reflection prevention layer and a fingerprint prevention layer.

In an embodiment, the display device DD may further include at least one adhesive layer. The adhesive layer may bond adjacent components of the display device DD. The adhesive layer may be an optically clear adhesive layer or a pressure sensitive adhesive layer.

The electronic module EM includes at least a main controller. The electronic module EM may include a wireless communication module, an image input module, a sound input module, a sound output module, a memory, an external interface module, and the like. The modules may be mounted on a circuit board, or may be electrically connected though a flexible circuit board. The electronic module EM is electrically connected to the power module PSM.

The main controller MC controls the overall operation of the display device DD. The main controller MC may control not only the operation of the display module DM, but also the operation of each of a wireless communication module, an image input module, a sound input module, a sound output module, and the like. The main controller MC may include at least one microprocessor.

The case EDC may be coupled to the window WM. The case EDC may absorb impact applied from outside of the display device DD and may prevent foreign materials/moisture and the like from penetrating into the display device DD, thereby protecting components in the case EDC. In an embodiment of the inventive concept, the case EDC may be provided in a form in which a plurality of housing members are coupled to each other.

FIG. 3 is a view for describing an operation between a display device and an input device according to an embodiment of the inventive concept.

Referring to FIG. 3, the display device DD may sense inputs provided from outside of the display device DD. For example, the display device DD may sense a first input IP1 applied by a first input source 1000 and a second input IP2 applied by a second input source 2000.

The first input source 1000 may include all input means capable of bringing a change in capacitance, such as a user's body and a passive-type pen. The second input source 2000 may be an electronic pen which provides a driving signal. In an example illustrated in FIG. 2, the second input source 2000 may be an active pen of an active type.

The display device DD and the second input source 2000 may communicate with each other in a bidirectional manner. The display device DD may provide an up-link signal ULS to the second input source 2000, and the second input source 2000 may provide a down-link signal DLS to the display device DD. For example, the up-link signal ULS may include information such as panel information, a protocol version, and the like. However, embodiments of the inventive concept are not limited thereto. The down-link signal DLS may include a synchronization signal or information on the state of the second input source 2000. For example, the down-link signal DLS may include the coordinate information, battery information, slope information of the second input source 2000, and/or various information stored in the second input source 2000. However, embodiments of the inventive concept are not limited thereto.

The display device DD may include the display panel 100, the input sensor 200, the panel driving circuit PDC, the sensor controller SCC, and the main controller MC.

The display panel 100 may be a component which substantially generates an image. The display panel 100 may be a light-emitting type display layer. For example, the display panel 100 may be an organic light emitting display layer, a quantum-dot display layer, a micro-LED display layer, or a nano-LED display layer.

The input sensor 200 may be disposed on the display panel 100. The input sensor 200 may sense an external input applied from outside of the display device DD. The input sensor 200 may sense a first input IP1 applied by the first input source 1000 and a second input IP2 applied by the second input source 2000.

The main controller MC may control the overall operation of the display device DD. For example, the main controller MC may control the operation of the panel driving unit PDC and the operation of the sensor driving unit SCC. The main controller MC may include at least one microprocessor. The main controller MC may be referred to as a host. The main controller MC may further include a graphics controller.

The panel driving circuit PDC may drive the display panel 100. The panel driving circuit PDC may receive image data RGB and a driving control signal D-CS from the main controller MC. The driving control signal D-CS may include various signals. For example, the driving control signal D-CS may include a vertical synchronization signal, a horizontal synchronization signal, a clock signal, a data enable signal, and the like. The panel driving circuit PDC may generate signals to be provided to the display panel 100 based on the driving control signal D-CS.

The sensor controller SCC may transmit and receive a signal with the input sensor 200. The sensor controller SCC may receive a sensor control signal I-CS from the main controller MC. The sensor control signal I-CS may include a mode determination signal which determines the driving mode of the sensor controller SCC, and a clock signal. The sensor controller SCC may operate, based on the sensor control signal I-CS, in a first sensing mode for sensing the first input IP1 applied by the first input source 1000 or in a second sensing mode for sensing the second input IP2 applied by the second input source 2000. In the following description, the first sensing mode and the second sensing mode are respectively referred to as a touch sensing mode and a pen sensing mode.

The sensor controller SCC may calculate coordinate information of the first input IP1 or of the second input IP2 based on a signal received from the input sensor 200, and may provide a coordinate signal I-SS corresponding to the coordinate information to the main controller MC. The main controller MC executes an operation corresponding to a user input based on the coordinate signal I-SS. For example, the main controller MC may operate the panel driving unit PDC such that a new application image is displayed on the display panel 100.

Figure 4A:
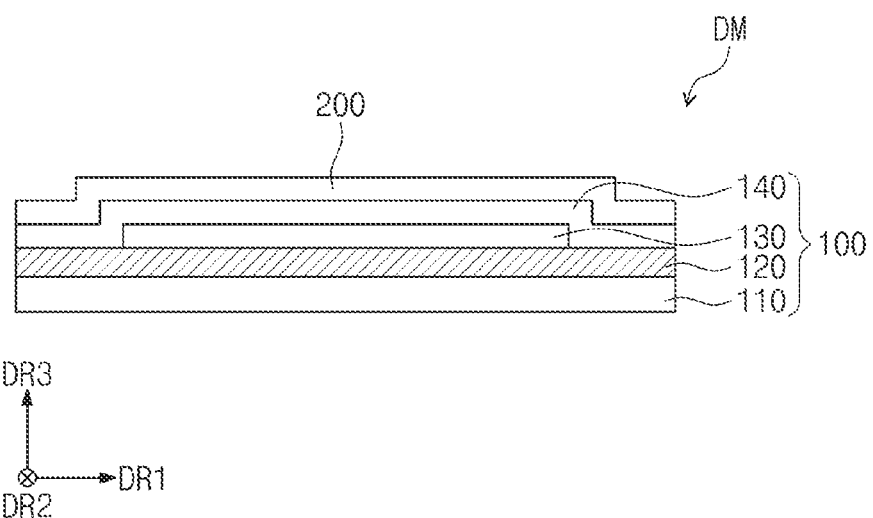
FIG. 4A is a cross-sectional view of a display module according to an embodiment of the inventive concept.

FIG. 4A is a cross-sectional view of the display module DM according to an embodiment of the inventive concept.

Referring to FIG. 4A, the display module DM may include the display panel 100 and the input sensor 200.

The display panel 100 may include a base layer 110, a circuit layer 120, a light emitting element layer 130, and an encapsulation layer 140.

The base layer 110 may be a member which provides a base surface on which the circuit layer 120 is disposed. The base layer 110 may be, for example, a glass substrate, a metal substrate, or a polymer substrate. However, embodiments of the inventive concept are not limited thereto. For example, in some embodiments, the base layer 110 may be an inorganic layer, an organic layer, or a composite material layer.

The base layer 110 may have a multi-layered structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include at least one of, for example, an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In the present disclosure, "~~"-based resin means that a functional group of "~~" is included.

The circuit layer 120 may be disposed on the base layer 110. The circuit layer 120 may include, for example, an insulation layer, a semiconductor pattern, a conductive pattern, a signal line, and the like. The insulation layer, a semiconductor layer, and a conductive layer are formed on the base layer 110 by coating, deposition, and the like, and thereafter, the insulation layer, the semiconductor layer, and the conductive layer may be selectively patterned through performing a photolithography process a plurality of times. Thereafter, the semiconductor pattern, the conductive pattern, and the signal line, all included in the circuit layer 120, may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro LED, or a nano LED.

The encapsulation layer 140 may be disposed on the light emitting element layer 130. The encapsulation layer 140 may protect the light emitting element layer 130 from foreign materials such as, for example, moisture, oxygen, and dust particles.

The input sensor 200 may be disposed on the display panel 100. The input sensor 200 may sense an external input applied from outside of the display device DD. The external input may be a user input. The user input includes various forms of external inputs such as, for example, a part of a user's body, light, heat, a pen, and pressure.

The input sensor 200 may be disposed on the display panel 100 through a series of processes. In this case, the input sensor 200 may be described as being directly disposed on the display panel 100. Being directly disposed means that a third component is not disposed between the input sensor 200 and the display panel 100. That is, in an embodiment, a separate adhesive member is not disposed between the input sensor 200 and the display panel 100.

Alternatively, in an embodiment, the input sensor 200 and the display panel 100 may be coupled to each other through an adhesive member. The adhesive member may include a typical adhesive or a pressure-sensitive adhesive.

In an embodiment, the display device DD may further include a reflection prevention layer and an optical layer disposed on the input sensor 200. The reflection prevention layer may reduce the reflectance of external light incident from the outside of the display device DD. The optical layer may increase the front surface luminance of the display device DD by controlling the direction of light incident from the display panel 100.

Figure 4B:
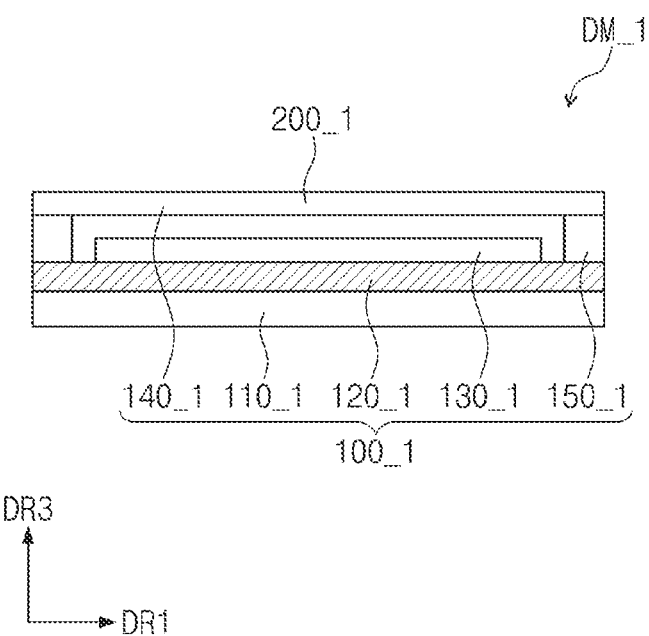
FIG. 4B is a cross-sectional view of a display module according to an embodiment of the inventive concept.

FIG. 4B is a cross-sectional view of a display module DM_1 according to an embodiment of the inventive concept.

Referring to FIG. 4B, the display module DM_1 may include a display panel 100_1 and an input sensor 200_1. The display panel 100_1 may include a base substrate 110_1, a circuit layer 120_1, a light emitting element layer 130_1, an encapsulation substrate 140_1, and a coupling member 150_1.

Each of the base substrate 110_1 and the encapsulation substrate 140_1 may be, for example, a glass substrate, a metal substrate, a polymer substrate, or the like. However, embodiments of the inventive concept are not limited thereto.

The coupling member 150_1 may be disposed between the base substrate 110_1 and the encapsulation substrate 140_1. The coupling member 150_1 may couple the encapsulation substrate 140_1 to the base substrate 110_1 or to the circuit layer 120_1. The coupling member 150_1 may include an inorganic material or an organic material. For example, the inorganic material may include a frit seal, and the organic material may include a photo-curable resin or a photo-plastic resin. However, the material constituting the coupling member 150_1 is not limited to the above examples.

The input sensor 200_1 may be directly disposed on the encapsulation substrate 140_1. Being directly disposed means that a third component is not disposed between the input sensor 200_1 and the encapsulation substrate 140_1. That is, in an embodiment, a separate coupling member is not disposed between the input sensor 200_1 and display panel 100_1. However, embodiments of the inventive concept are not limited thereto. For example, in an embodiment, an adhesive layer may be further disposed between the input sensor 200_1 and the encapsulation substrate 140_1.

Figure 5:
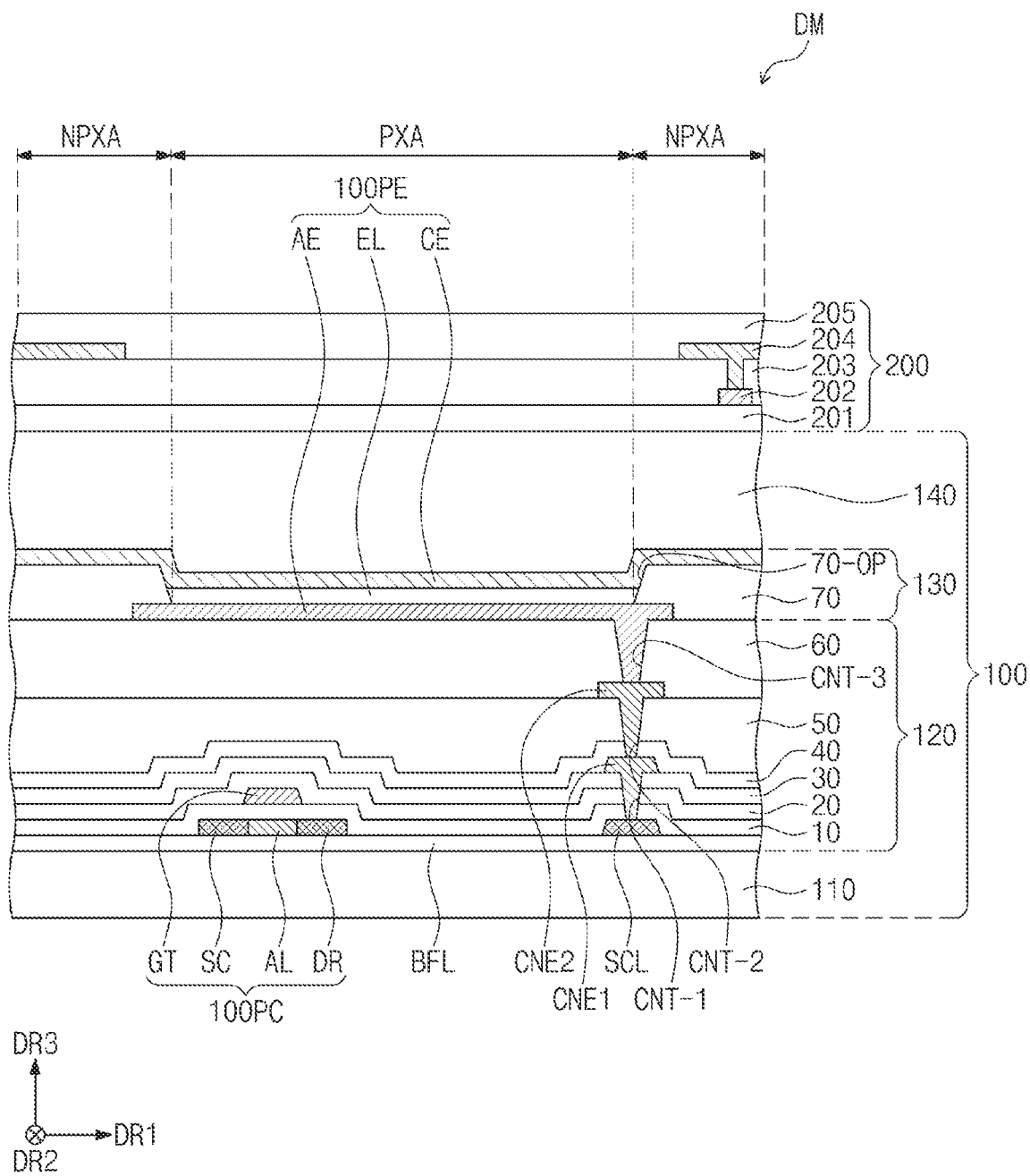
FIG. 5 is a cross-sectional view of a display module according to an embodiment of the inventive concept.

FIG. 5 is a cross-sectional view of the display module DM according to an embodiment of the inventive concept.

Referring to FIG. 5, at least one inorganic layer is formed on an upper surface of the base layer 110. The inorganic layer may include at least one of, for example, aluminum oxide, titanium oxide, silicon oxide, silicon nitride, silicon oxynitride, zirconium oxide, or hafnium oxide. The inorganic layer may be formed as a multi-layered inorganic layer. The multi-layered inorganic layers may constitute the barrier layer and/or the buffer layer. In an embodiment, the display panel 100 is illustrated as including a buffer layer BFL, as shown in FIG. 5.

The buffer layer BFL may increase the bonding force between the base layer 110 and the semiconductor pattern. The buffer layer BFL may include at least one of silicon oxide, silicon nitride, or silicon oxynitride. For example, the buffer layer BFL may include a structure in which a silicon oxide layer and a silicon nitride layer are alternately stacked.

The semiconductor pattern may be disposed on the buffer layer BFL. The semiconductor pattern may include polysilicon. However, embodiments of the inventive concept are not limited thereto. For example, the semiconductor pattern may include amorphous silicon, low-temperature polycrystalline silicon, or an oxide semiconductor.

For convenience of illustration, FIG. 5 only illustrates a portion of the semiconductor pattern. It is to be understood that the semiconductor pattern may be further disposed in another region. The semiconductor pattern may be arranged according to a specific rule across pixels. The semiconductor pattern may have different electrical properties depending on whether the semiconductor pattern is doped. The semiconductor pattern may include a first region having a high conductivity rate and a second region having a low conductivity rate. The first region may be doped with an N-type dopant or a P-type dopant. A P-type transistor may include a doped region which has been doped with the P-type dopant, and an N-type transistor may include a doped region which has been doped with the N-type dopant. The second region may be a non-doped region or a region doped to a lower concentration than the first region.

The conductivity of the first region may be greater than the conductivity of the second region, and the first region may substantially serve as an electrode or a signal line. The second region may substantially correspond to an active (or a channel) of a transistor. In other words, a portion of the semiconductor pattern may be an active of the transistor, another portion thereof may be a source or a drain of the transistor, and the other portion thereof may be a connection electrode or a connection signal line.

Figure 6:
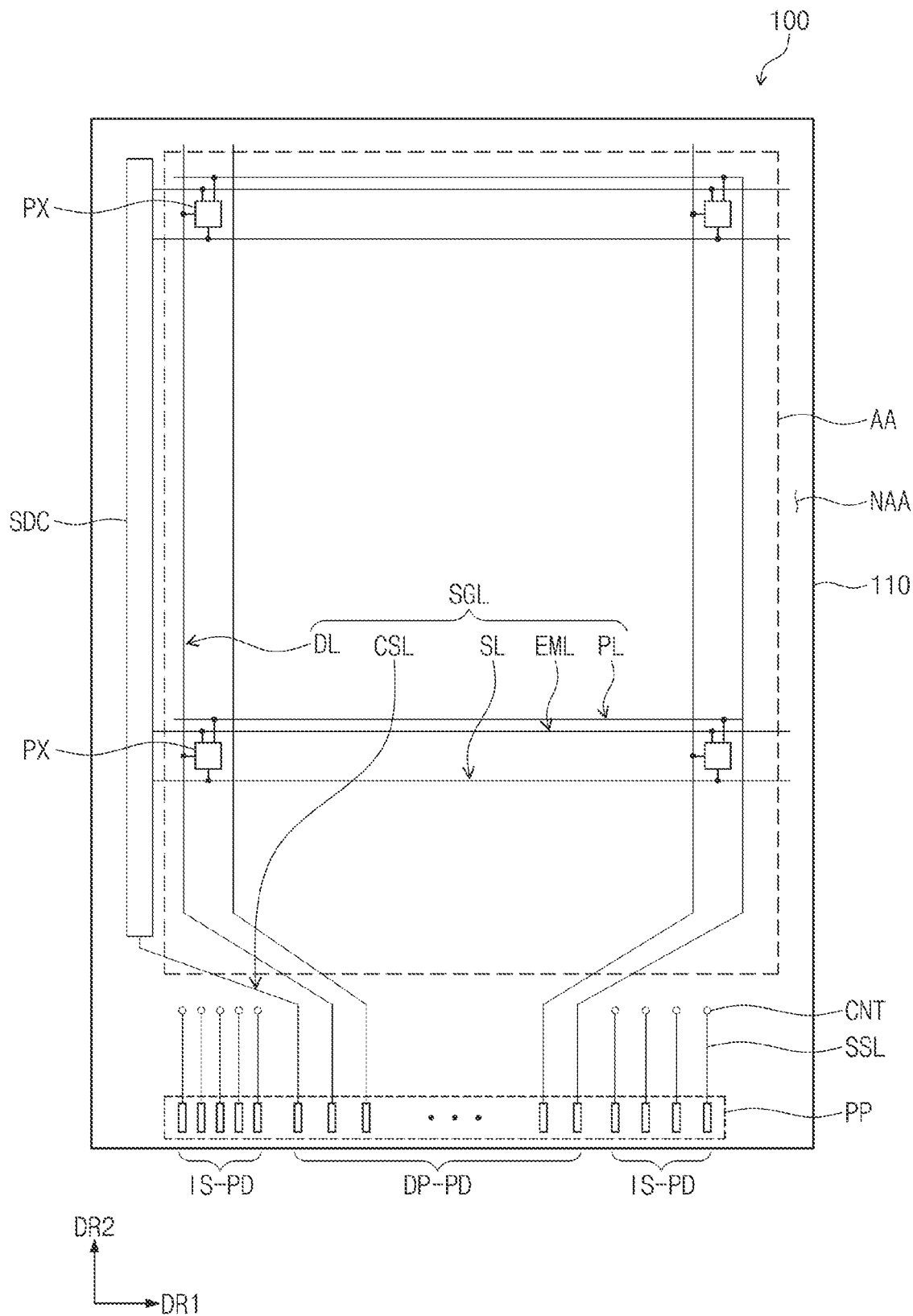
FIG. 6 is a plan view of a display panel according to an embodiment of the inventive concept.

The display panel 100 may include a plurality of pixels PX (refer to FIG. 6). Each of the pixels PX may include, for example, a plurality of transistors, one capacitor, and a light emitting element. In FIG. 5, among the plurality of transistors included in each of the pixels PX, for convenience of explanation, only one transistor 100PC and one light emitting element 100PE are exemplarily illustrated and described.

A source SC, an active AL, and a drain DR of the transistor 100PC may be formed from the semiconductor pattern. The source SC and the drain DR may be extended in opposite directions from the active AL on a cross-section. FIG. 5 illustrates a portion of a connection signal line SCL formed from the semiconductor pattern. In an embodiment, the connection signal line SCL may be connected to the drain DR of the transistor 100PC on a plane.

A first insulation layer 10 may be disposed on the buffer layer BFL. The first insulation layer 10 commonly overlaps a plurality of pixels, and may cover the semiconductor pattern. The first insulation layer 10 may be an inorganic layer and/or an organic layer, and may have a single-layered structure or a multi-layered structure. The first insulation layer 10 may include at least one of, for example, aluminum oxide, titanium oxide, silicon oxide, silicon nitride, silicon oxynitride, zirconium oxide, or hafnium oxide. In an embodiment, the first insulation layer 10 may be a silicon oxide layer of a single layer. The first insulation layer 10, as well as an insulation layer of the circuit layer 120 to be described later, may be an inorganic layer and/or an organic layer, and may have a single-layered structure or a multi-layered structure. The inorganic layer may include at least one of the above-described materials. However, embodiments of the inventive concept are not limited thereto.

A gate GT of the transistor 100PC is disposed on the first insulation layer 10. The gate GT may be a portion of a metal pattern. The gate GT overlaps the active AL. In a process of doping the semiconductor pattern, the gate GT may function as a mask.

A second insulation layer 20 is disposed on the first insulation layer 10, and may cover the gate GT. The second insulation layer 20 may commonly overlap pixels. The second insulation layer 20 may be an inorganic layer and/or an organic layer, and may have a single-layered structure or a multi-layered structure. The second insulation layer 20 may include at least one of, for example, silicon oxide, silicon nitride, or silicon oxynitride. In an embodiment, the second insulation layer 20 may have a multi-layered structure including a silicon oxide layer and a silicon nitride layer.

A third insulation layer 30 may be disposed on the second insulation layer 20. The third insulation layer 30 may have a single-layered structure or a multi-layered structure. For example, the third insulation layer 30 may have a multi-layered structure including a silicon oxide layer and a silicon nitride layer.

A first connection electrode CNE1 may be disposed on the third insulation layer 30. The first connection electrode CNE1 may be connected to the connection signal line SCL through a contact hole CNT-1 passing through the first to third insulation layers 10, 20, and 30.

A fourth insulation layer 40 may be disposed on the third insulation layer 30. The fourth insulation layer 40 may be a silicon oxide layer of a single layer. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 through a contact hole CNT-2 passing through the fourth insulation layer 40 and the fifth insulation layer 50.

A sixth insulation layer 60 is disposed on the fifth insulation layer 50, and may cover the second connection electrode CNE2. The sixth insulation layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a micro LED, or a nano LED. Hereinafter, the light emitting element 100PE is exemplarily described as being an organic light emitting element. However, embodiments of the inventive concept are not limited thereto.

The light emitting element 100PE may include a first electrode AE, a light emitting layer EL, and a second electrode CE.

The first electrode AE may be disposed on the sixth insulation layer 60. The first electrode AE may be connected to the second connection electrode CNE2 through a contact hole CNT-3 passing through the sixth insulation layer 60.

A pixel definition film 70 is disposed on the sixth insulation layer 60, and may cover a portion of the first electrode AE. An opening 70-OP is defined on the pixel definition film 70. The opening 70-OP of the pixel definition film 70 exposes at least a portion of the first electrode AE.

The active region DA (refer to FIG. 1) may include a light emitting region PXA, and a non-light emitting region NPXA adjacent to the light emitting region PXA. The non-light emitting region NPXA may surround the light emitting region PXA. In an embodiment, a light emitting region PXA is defined to correspond to some regions of the first electrode AE exposed by the opening 70-OP.

The light emitting layer EL may be disposed on the first electrode AE. The light emitting layer EL may be disposed in a region corresponding to the opening 70-OP. That is, the light emitting layer EL may be divided and formed in each of the pixels. When the light emitting layer EL is divided and formed in each of the pixels, each of the light emitting layers EL may emit light of at least one color of blue, red, or green. However, embodiments of the inventive concept are not limited thereto, and the light emitting layer EL may be connected to the pixels and commonly provided. In this case, the light emitting layer EL may provide blue light or white light.

The second electrode CE may be disposed on the light emitting layer EL. The second electrode CE has an integral shape, and may be commonly disposed in the plurality of pixels. The second electrode CE may also be referred to as a common electrode.

In an embodiment, a hole control layer may be disposed between the first electrode AE and the light emitting layer EL. The hole control layer may be commonly disposed in the light emitting region PXA and the non-light emitting region NPXA. The hole control layer includes a hole transport layer, and may further include a hole injection layer. An electron control layer may be disposed between the light emitting layer EL and the second electrode CE. The electron control layer includes an electron transport layer, and may further include an electron injection layer. The hole control layer and the electron control layer may be commonly formed in the plurality of pixels using an open mask.

The encapsulation layer 140 may be disposed on the light emitting element layer 130. The encapsulation layer 140 may include, for example, an inorganic layer, an organic layer, and an inorganic layer sequentially stacked. However, layers constituting the encapsulation layer 140 are not limited thereto.

The inorganic layers may protect the light emitting element layer 130 from moisture and oxygen, and the organic layer may protect the light emitting element layer 130 from foreign materials such as dust particles. The inorganic layers may include, for example, a silicon nitride layer, a silicon oxynitride layer, a silicon oxide layer, a titanium oxide layer, an aluminum oxide layer, or the like. The organic layer may include, for example, an acrylic organic layer. However, embodiments of the inventive concept are not limited thereto.

The input sensor 200 may include a base layer 201, a first conductive layer 202, a sensing insulation layer 203, a second conductive layer 204, and a cover insulation layer 205.

The base layer 201 may be an inorganic layer including at least one of, for example, silicon nitride, silicon oxynitride, or silicon oxide. Alternatively, the base layer 201 may be an organic layer including, for example, an epoxy resin, an acrylic resin, or an imide-based resin. The base layer 201 may have a single-layered structure, or a multi-layered structure in which layers are stacked along the third direction DR3.

Each of the first conductive layer 202 and the second conductive layer 204 may have a single-layered structure, or a multi-layered structure in which layers are stacked along the third direction DR3.

A conductive layer of a single-layered structure may include a metal layer or a transparent conductive layer. The metal layer may include, for example, molybdenum, silver, titanium, copper, aluminum, or an alloy thereof. The transparent conductive layer may include a transparent conductive oxide such as, for example, indium tin oxide (ITO), indium zinc oxide (IZO), zinc oxide (ZnO), indium tin zinc oxide (ITZO), or the like. In addition, the transparent conductive layer may include a conductive polymer such as, for example, PEDOT, a metal nanowire, graphene, and the like.

A conductive layer of a multi-layered structure may include metal layers. The metal layers may have, for example, a three-layered structure of titanium/aluminum/titanium. The conductive layer of a multi-layered structure may include at least one metal layer and at least one transparent conductive layer.

At least one of the sensing insulation layer 203 and the cover insulation layer 205 may include an inorganic film. The inorganic film may include at least one of, for example, aluminum oxide, titanium oxide, silicon oxide, silicon nitride, silicon oxynitride, zirconium oxide, or hafnium oxide.

At least one of the sensing insulation layer 203 and the cover insulation layer 205 may include an organic film. The organic film may include at least any one among, for example, an acrylic resin, a methacryl-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

FIG. 6 is a plan view of the display panel 100 according to an embodiment of the inventive concept.

As illustrated in FIG. 6, the display panel 100 may include a scan driving circuit SDC formed on the base layer 110, a plurality of signal lines SGL (hereinafter, signal lines), a plurality of signal pads DP-PD and IS-PD (hereinafter, signal pads), and a plurality of pixels PX (hereinafter, pixels).

The scan driving circuit SDC generates a plurality of scan signals (hereinafter, scan signals), and sequentially outputs the scan signals to a plurality of scan lines SL (hereinafter, scan lines) to be described below. The scan driving circuit SDC may output other control signals as well as scan signals to the pixels PX.

The scan driving circuit SDC may include a plurality of transistors formed through the same process as transistors in the pixels PX.

The signal lines SGL include scan lines SL, data lines DL, a power line PL, a light emission control line EML, and a control signal line CSL. Each of the scan lines SL, data lines DL, and light emission control lines EML is connected to a corresponding pixel PX among the pixels PX. The power line PL is commonly connected to the pixels PX. The control signal line CSL may provide control signals to the scan driving circuit SDC. The power line PL may provide a voltage utilized for the operation of the pixels PX. The power line PL may include a plurality of lines which provide different voltages.

In an embodiment, the signal lines SGL may further include auxiliary lines SSL. The auxiliary lines SSL are signal lines electrically connected to the input sensor 200 (refer to FIG. 7). In an embodiment of the inventive concept, the auxiliary lines SSL may be omitted. The auxiliary lines SSL are respectively connected to contact holes CNT. The auxiliary lines SSL may be electrically connected to signal lines of the input sensor 200 (refer to FIG. 7) to be described below through the contact holes CNT.

The signal pads DP-PD and IS-PD may include first-type signal pads DP-PD connected to the data lines DL, the power line PL, and the control signal line CSL, and second-type signal pads IS-PD connected to the auxiliary lines SSL. The first-type signal pads DP-PD and the second-type signal pads IS-PD are disposed adjacent to each other in the pad region PP defined in a portion of the peripheral region NAA. In an embodiment, the laminate structure or constituent materials of the signal pads DP-PD and IS-PD are not distinguished from each other, and may be formed through the same process.

The active region AA may be defined as a region in which the pixels PX are disposed. A plurality of electronic elements are disposed in the active region AA. The electronic elements may include an organic light emitting diode provided in each of the pixels PX and a pixel driving circuit connected to the organic light emitting diode. The scan driving circuit SDC, the signal lines SGL, the signal pads DP-PD and IS-PD, and the pixel driving circuit may be included in a circuit element layer.

In an embodiment, each of the pixels PX may include a plurality of transistors, a capacitor, and an organic light emitting diode. The pixels PX are electrically connected to the scan lines SL, the data lines DL, the light emission control lines EML, and the power line PL, and emit light in response to signals received through the scan lines SL, the data lines DL, the light emission control lines EML, and the power line PL.

The signal pads DP-PD and IS-PD of the display panel 100 may be electrically connected to the flexible circuit board FCB illustrated in FIG. 2.

The display panel 100 illustrated in FIG. 6 may be partially bent. A portion of the peripheral region NAA of the display panel 100 may be bent, and may be bent based on a bending axis substantially parallel to the first direction DR1. The bending axis may be defined to overlap some of the control signal lines CSL, some of the data lines DL, and some of the auxiliary lines SSL.

Figure 7:
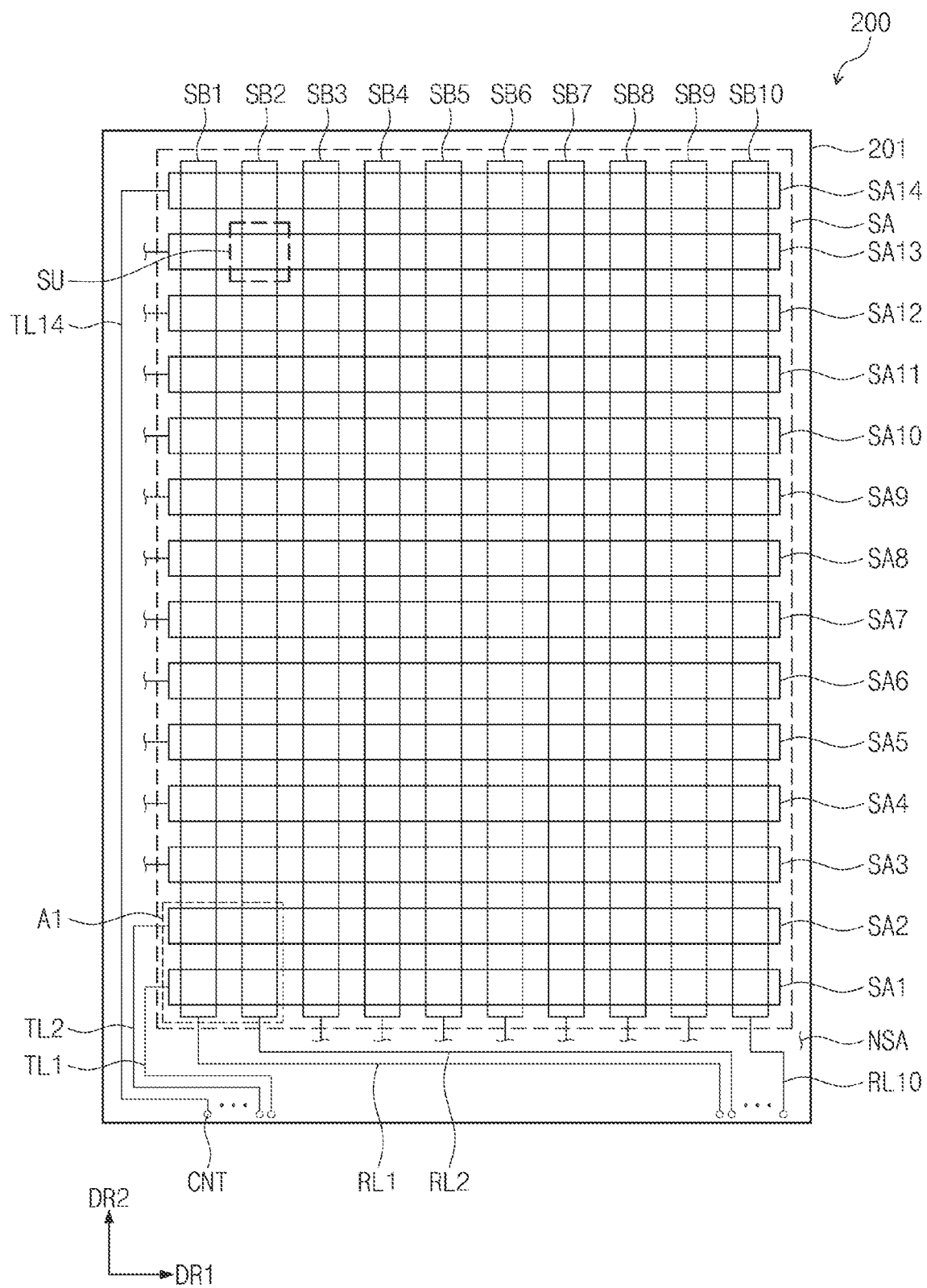
FIG. 7 is a plan view of an input sensor according to an embodiment of the inventive concept.

FIG. 7 is a plan view of the input sensor 200 according to an embodiment of the inventive concept.

Referring to FIG. 7, the input sensor 200 may include a sensing region SA and a non-sensing region NSA. The sensing region SA may be a region activated according to an electrical signal. For example, the sensing region SA may be a region which senses an input. The non-sensing region NSA may surround the sensing region SA. The sensing region SA may correspond to the active region AA of FIG. 6, and the non-sensing region NSA may correspond to the peripheral region NAA of FIG. 6.

The input sensor 200 includes first sensing electrodes SA1 to SA14 and second sensing electrodes SB1 to SB10 formed on the base layer 201. The first sensing electrodes SA1 to SA14 and the second sensing electrodes SB1 to SB1 are disposed in the sensing region SA. The first sensing electrodes SA1 to SA14 and the second sensing electrodes SB1 to SB10 are electrically insulated from each other and intersect each other in the sensing region SA. In an embodiment of the inventive concept, the input sensor 200 includes the first sensing electrodes SA1 to SA14 and the second sensing electrodes SB1 to SB10. However, embodiments of the inventive concept are not limited thereto. For example, the number of each of first sensing electrodes and second sensing electrodes may vary according to embodiments of the inventive concept. FIG. 7 illustrates that the number of first sensing electrodes is larger than the number of second sensing electrodes. However, embodiments of the inventive concept are not limited thereto. For example, in an embodiment, the number of second sensing electrodes may be larger than or equal to the number of first sensing electrodes.

In an embodiment, the input sensor 200 may obtain information on the position of an external input through a change in mutual capacitance between the first sensing electrodes SA1 to SA14 and the second sensing electrodes SB1 to SB10.

In an embodiment, the input sensor 200 may obtain information on the position of an input applied by the second input source 2000 through a signal received by the first sensing electrodes SA1 to SA14 and the second sensing electrodes SB1 to SB10 from the second input source 2000.

The input sensor 200 may further include first to fourteenth transmission lines TL1 to TL14 and first to tenth reception lines RL1 to RL10. For convenience of illustration, FIG. 7 illustrates transmission lines TL1, TL2 and TL14 but does not illustrate transmission lines TL3 to TL13, and illustrates reception lines RL1, RL2 and RL10, but does not illustrate reception lines RL3 to RL9. The first to fourteenth transmission lines TL1 to TL14 and the first to tenth reception lines RL1 to RL10 may be disposed in the non-sensing region NSA. The first to fourteenth transmission lines TL1 to TL14 are electrically connected to one side of the first sensing electrodes SA1 to SA14, and the first to tenth reception lines RL1 to RL10 are electrically connected to one side of the second sensing electrodes SB1 to SB10. However, embodiments of the inventive concept are not limited thereto. In an embodiment of the inventive concept, the input sensor 200 may further include reception lines electrically connected to the other side of the second sensing electrodes SB1 to SB10. The first to fourteenth transmission lines TL1 to TL14 and the first to tenth reception lines RL1 to RL10 are names given for convenience of explanation, and functions are not limited by each name. For example, the first to fourteenth transmission lines TL1 to TL14 may transmit signals to the first sensing electrodes SA1 to SA14, or may receive signals from the first sensing electrodes SA1 to SA14. Thus, the first to fourteenth transmission lines TL1 to TL14 may transmit and/or receive signals. The first to tenth reception lines RL1 to RL10 may transmit signals to the second sensing electrodes SB1 to SB10, or may receive signals from the second sensing electrodes SB1 to SB10. Thus, the first to tenth reception lines RL1 to RL10 may transmit and/or receive signals.

The first sensing electrodes SA1 to SA14 and the second sensing electrodes SB1 to SB10 may be defined as one sensing unit SU.

The first to fourteenth transmission lines TL1 to TL14 and the first to tenth reception lines RL1 to RL10 may be electrically connected to the auxiliary lines SSL illustrated in FIG. 6 through the contact holes CNT.

Figure 8:
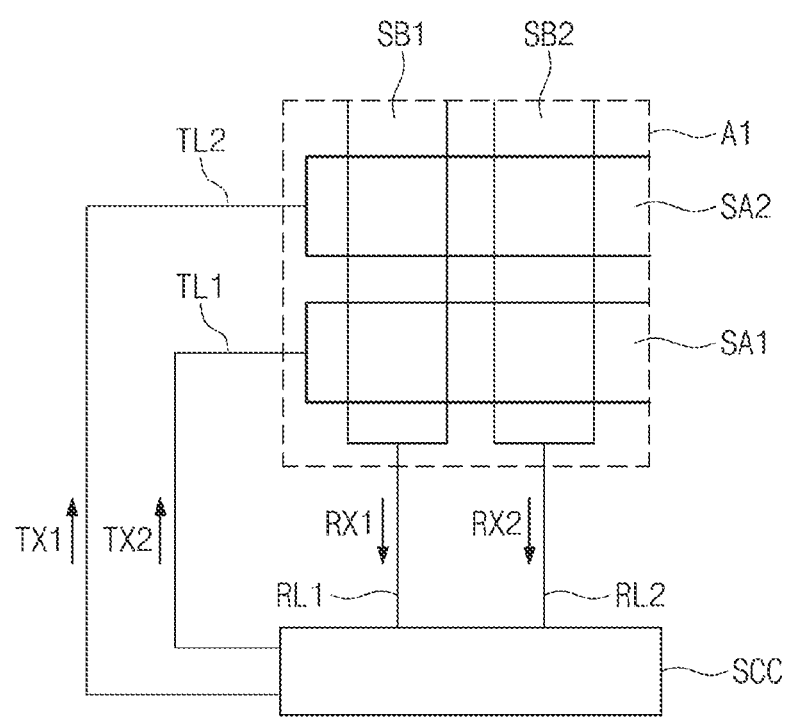
FIG. 8 is a view for describing an operation of an input sensor in a touch sensing mode according to an embodiment of the inventive concept.

FIG. 8 is a view for describing an operation of an input sensor in a touch sensing mode according to an embodiment of the inventive concept.

Referring to FIGS. 7 and 8, the first sensing electrode SA1 to SA14 may operate as transmission electrodes, and the second sensing electrodes SB1 to SB10 may operate as reception electrodes. The sensor controller SCC may sense an external input by sensing an amount of change in mutual capacitance formed between the first sensing electrodes SA1 to SA14 and the second sensing electrodes SB1 to SB10.

For convenience of description, FIG. 8 illustrates only a region A1 including first sensing electrodes SA1 and SA2 among the first sensing electrodes SA1 to SA14 and second sensing electrodes SB1 and SB2 among the second sensing electrodes SB1 to SB10 illustrated in FIG. 7. First sensing electrodes SA3 to SA14 and second sensing electrodes SB3 to SB10 illustrated in FIG. 7 may also be driven in the same manner as the first sensing electrodes SA1 and SA2 and the second sensing electrodes SB1 and SB2.

The sensor controller SCC may provide transmission signals TX1 and TX2 to the first sensing electrodes SA1 and SA2 through first and second transmission lines TL1 and TL2. The sensor controller SCC may receive sensing signals RX1 and RX2 from the second sensing electrodes SB1 and SB2 through first and second reception lines RL1 and RL2. Therefore, the sensor controller SCC may generate coordinate values for a position at which the first input IP1 applied by the first input source 1000 (refer to FIG. 1) has been provided based on the transmission signals TX1 and TX2 and the amount of change of the sensing signals RX1 and RX2.

Figure 9A:
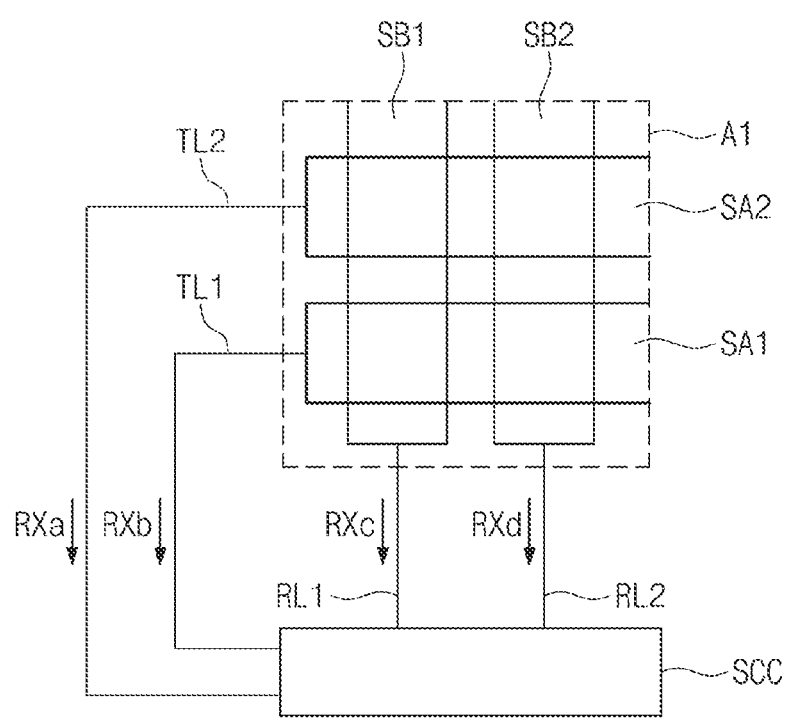
FIGS. 9A, 9B and 9C are views for describing an operation of an input sensor in a pen sensing mode according to an embodiment of the inventive concept.
Figure 9B:
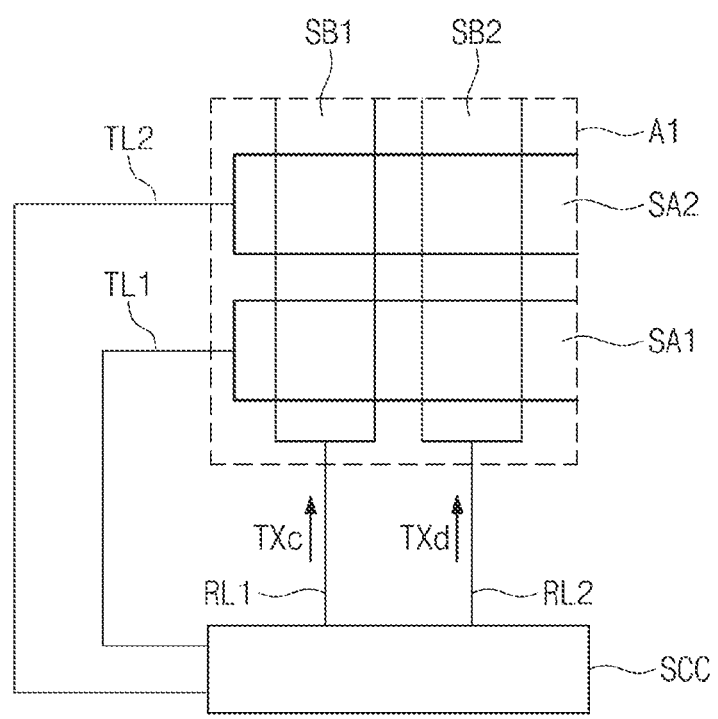
Figure 9C:
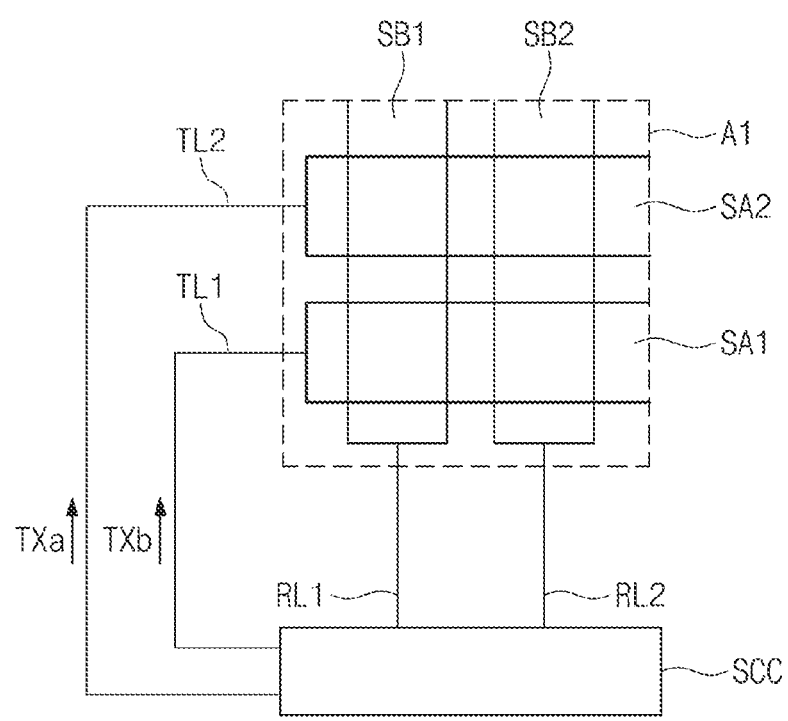

FIGS. 9A, 9B and 9C are views for describing an operation of an input sensor in a pen sensing mode according to an embodiment of the inventive concept.

Referring to FIGS. 9A, 9B and 9C, in the pen sensing mode, the sensor controller SCC may substantially simultaneously operate the first sensing electrodes SA1 and SA2 and the second sensing electrodes SB1 and SB2 as transmission electrodes or as reception electrodes.

Referring to FIG. 9A, during a predetermined period (hereinafter, first period), the first sensing electrodes SA1 and SA2 and the second sensing electrodes SB1 and SB2 respectively provide down-link signals RXa, RXb, RXc, and RXd to the sensor controller SCC. For example, the first sensing electrode SA1 provides the down-link signal RXb, the first sensing electrode SA2 provides the down-link signal RXa, the second sensing electrode SB1 provides the down-link signal RXc, and the second sensing electrode SB2 provides the down-link signal RXd. During the first period, the first sensing electrodes SA1 and SA2 and the second sensing electrodes SB1 and SB2 may be operated as reception electrodes for respectively receiving the down-link signals RXa, RXb, RXc, and RXd from the second input source 2000 (refer to FIG. 3).

Referring to FIG. 9B, during a predetermined period after the first period (second period), the second sensing electrodes SB1 and SB2 transmit up-link signals TXc and TXd provided from the sensor controller SCC to the second input source 2000. During the second period, the second sensing electrodes SB1 and SB2 may be operated as transmission electrodes for respectively providing the up-link signals TXc and TXd to the second input source 2000.

Referring to FIG. 9C, during a predetermined period after the first period (second period), the first sensing electrodes SA1 and SA2 transmit up-link signals TXa and TXb provided from the sensor controller SCC to the second input source 2000. During the second period, the first sensing electrodes SA1 and SA2 may be operated as transmission electrodes for respectively providing the up-link signals TXa and TXb to the second input source 2000.

Figure 10:
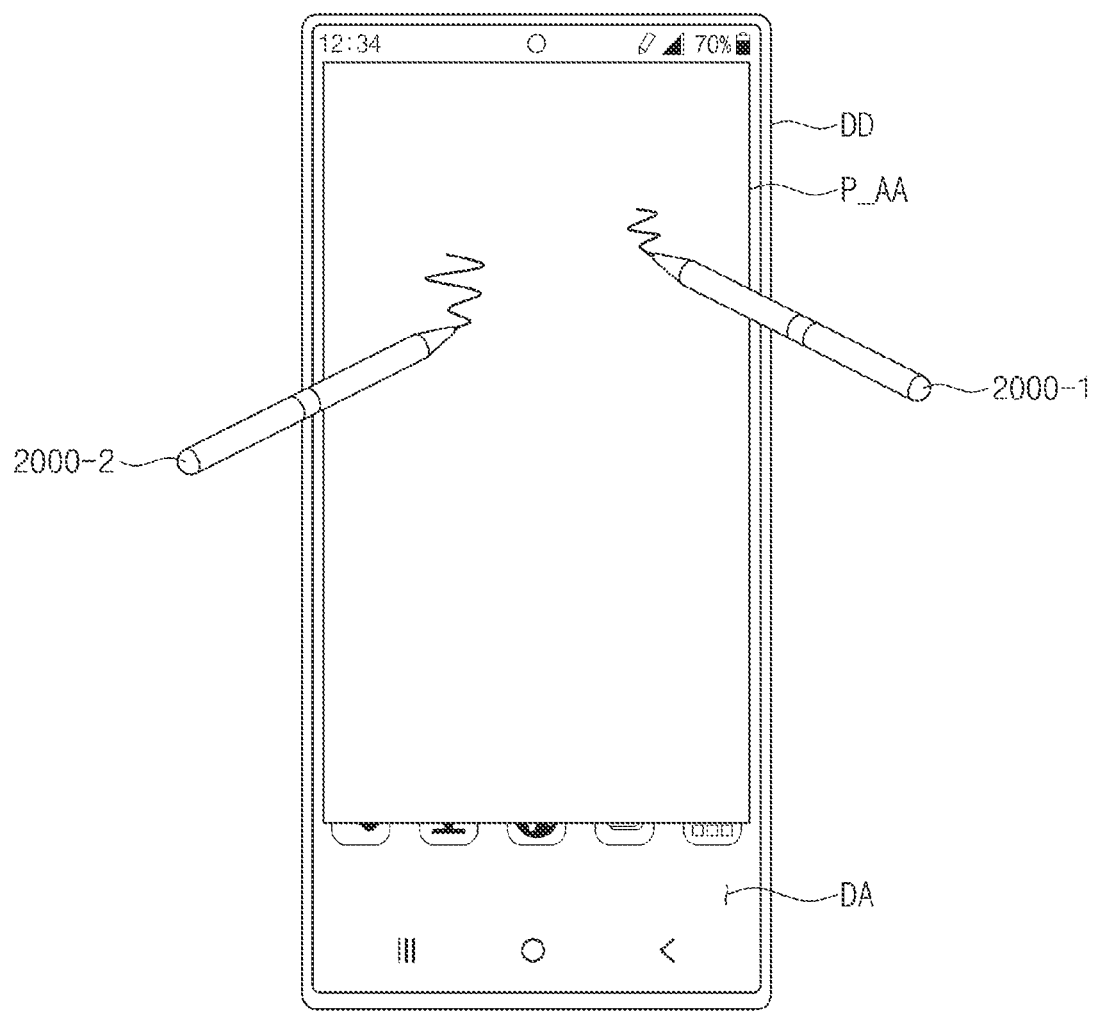
FIG. 10 is a view showing a state of sensing an input of a second input source in a pen sensing mode according to an embodiment of the inventive concept.

FIG. 10 is a view showing a state of sensing an input of a second input source in a pen sensing mode according to an embodiment of the inventive concept.

A user may choose to enter to the second sensing mode (the pen sensing mode) through a user interface. When the display device DD enters the pen sensing mode, the sensor controller SCC may operate in the pen sensing mode. In the pen sensing mode, a pen recognition region P_AA may be displayed in the active region DA of the display device DD.

During the pen sensing mode, the sensor controller SCC may substantially simultaneously sense second inputs from second sensing input sources 2000-1 and 2000-2. In other words, a first input applied by a second input source 2000-1 and a second input applied by a second input source 2000-2 may occur substantially simultaneously. In the following description, the second sensing sources 2000-1 and 2000-2 are referred to as a first pen 2000-1 and a second pen 2000-2, respectively.

FIG. 10 illustrates only the first pen 2000-1 and the second pen 2000-2 for convenience of illustration. However, embodiments of the inventive concept are not limited thereto. For example, in some embodiments, the display device DD may substantially simultaneously sense inputs from a plurality of two or more pens.

Each of the first pen 2000-1 and the second pen 2000-2 may first transmit a down-link signal to the display device DD, and may receive an up-link signal (or a response signal) from the display device DD.

FIGS. 11A, 11B, 12A and 12B are views for describing operations of first sensing electrodes, second sensing electrodes, and a sensor controller in a pen sensing mode according to an embodiment of the inventive concept.

Referring to FIGS. 11A, 11B, 12A and 12B, the sensor controller SCC includes a first transmission/reception circuit TRX1, a second transmission/reception circuit TRX2, and a control circuit CC. The sensor controller SCC may receive a first signal (or a down-link signal) from the input sensor 200 during a first period (or a down-link period), and may transmit a second signal (or an up-link signal) to the input sensor 200 during a second period (or an up-link period).

The first transmission/reception circuit TRX1 is electrically connected to the first sensing electrodes SA1 to SA14. The first transmission/reception circuit TRX1 may provide down-link signals received from the first sensing electrodes SA1 to SA14 to the control circuit CC as first reception signals RXS1. The first transmission/reception circuit TRX1 may provide first transmission signals TXS1 received from the control circuit CC to the first sensing electrodes SA1 to SA14.

The second transmission/reception circuit TRX2 is electrically connected to the second sensing electrodes SB1 to SB10. The second transmission/reception circuit TRX2 may provide down-link signals received from the second sensing electrodes SB1 to SB10 to the control circuit CC as second reception signals RXS2. The second transmission/reception circuit TRX2 may provide second transmission signals TXS2 received from the control circuit CC to the second sensing electrodes SB1 to SB10.

The control circuit CC may control the operation of the first transmission/reception circuit TRX1 and the operation of the second transmission/reception circuit TRX2. The control circuit CC may transmit and receive a signal with the main controller MC illustrated in FIG. 2.

Figure 11A:
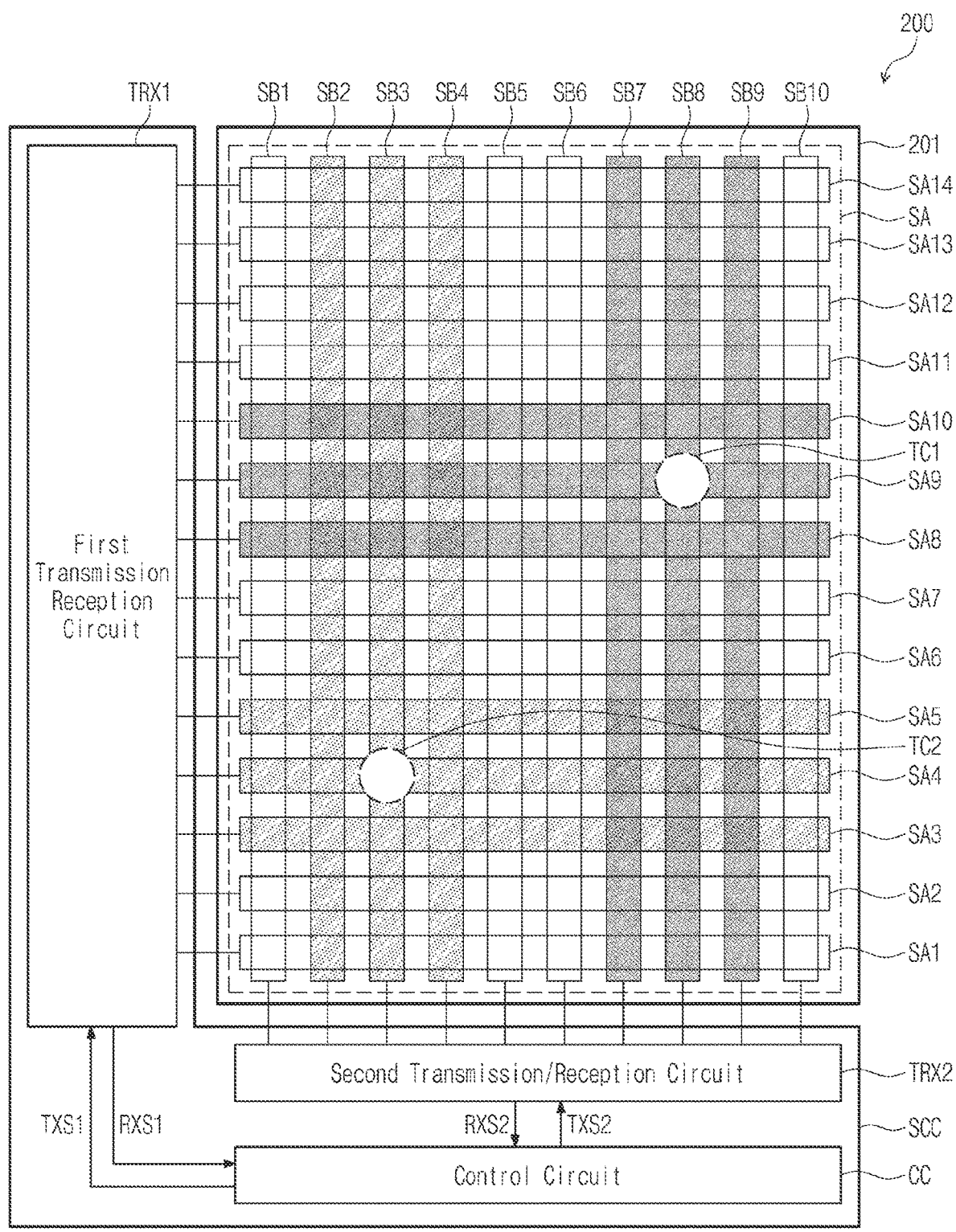
FIGS. 11A, 11B, 12A and 12B are views for describing operations of first sensing electrodes, second sensing electrodes, and a sensor controller in a pen sensing mode according to an embodiment of the inventive concept.

As illustrated in FIG. 11A, when the first pen 2000-1 (see FIG. 10) comes in contact with the input sensor 200, one or more first sensing electrodes adjacent to a first contact position TC1 among the first sensing electrodes SA1 to SA14 and one or more second sensing electrodes adjacent to the first contact position TC1 among the second sensing electrodes SB1 to SB10 may receive a down-link signal. Herein, the terms "contact position" and "input position" may be used interchangeably.

In addition, when the second pen 2000-2 (see FIG. 10) comes in contact with the input sensor 200, one or more first sensing electrodes adjacent to a second contact position TC2 among the first sensing electrodes SA1 to SA14 and one or more second sensing electrodes adjacent to the second contact position TC2 among the second sensing electrodes SB1 to SB10 may receive a down-link signal. The first contact position TC1 and the second contact position TC2 do not overlap each other. That is, the first contact position TC1 and the second contact position TC2 are different contact positions and are spaced apart from each other on the input sensor 200. The first contact position TC1 and the second contact position TC2 may be referred to as a first input position and a second input position, respectively.

For example, the first transmission/reception circuit TRX1 may receive a down-link signal corresponding to the first contact position TC1 from first sensing electrodes SA8 to SA10, and may receive a down-link signal corresponding to the second contact position TC2 from first sensing electrodes SA3 to SA5. The down-link signal corresponding to the first contact position TC1 and the down-link signal corresponding to the second contact position TC2 may be provided to the first transmission/reception circuit TRX1 substantially simultaneously.

The second transmission/reception circuit TRX2 may receive a down-link signal corresponding to the first contact position TC1 from second sensing electrodes SB7 to SB9, and may receive a down-link signal corresponding to the second contact position TC2 from second sensing electrodes SB2 to SB4. The down-link signal corresponding to the first contact position TC1 and the down-link signal corresponding to the second contact position TC2 may be provided to the second transmission/reception circuit TRX2 substantially simultaneously.

FIG. 11A illustrates that three first sensing electrodes among the first sensing electrodes SA1 to SA14 and three second sensing electrodes among the second sensing electrodes SB1 to SB10 receive a down-link signal. However, embodiments of the inventive concept are not limited thereto. In some embodiments, one or more first sensing electrodes adjacent to the first contact position TC1 among the first sensing electrodes SA1 to SA14 and one or more second sensing electrodes adjacent to the first contact position TC1 among the second sensing electrodes SB1 to SB10 may receive a down-link signal.

The first transmission/reception circuit TRX1 provides down-link signals received from the first sensing electrodes SA8 to SA10 and from the first sensing electrodes SA3 to SA5 to the control circuit CC as the first reception signals RXS1. The second transmission/reception circuit TRX2 provides down-link signals received from the second sensing electrodes SB2 to SB4 and from the second sensing electrodes SB7 to SB9 to the control circuit CC as the second reception signals RXS2.

The control circuit CC may determine the first contact position TC1 and the second contact position TC2 based on the first reception signals RXS1 and the second reception signals RXS2, and may provide information on the first contact position TC1 and the second contact position TC2 to the main controller MC illustrated in FIG. 2.

As described above, since down-link signals provided from the first pen 2000-1 and the second pen 2000-2 are received by the sensor controller SCC through the input sensor 200, an input applied by the first pen 2000-1 and an input applied by the second pen 2000-2 may be sensed.

Figure 11B:
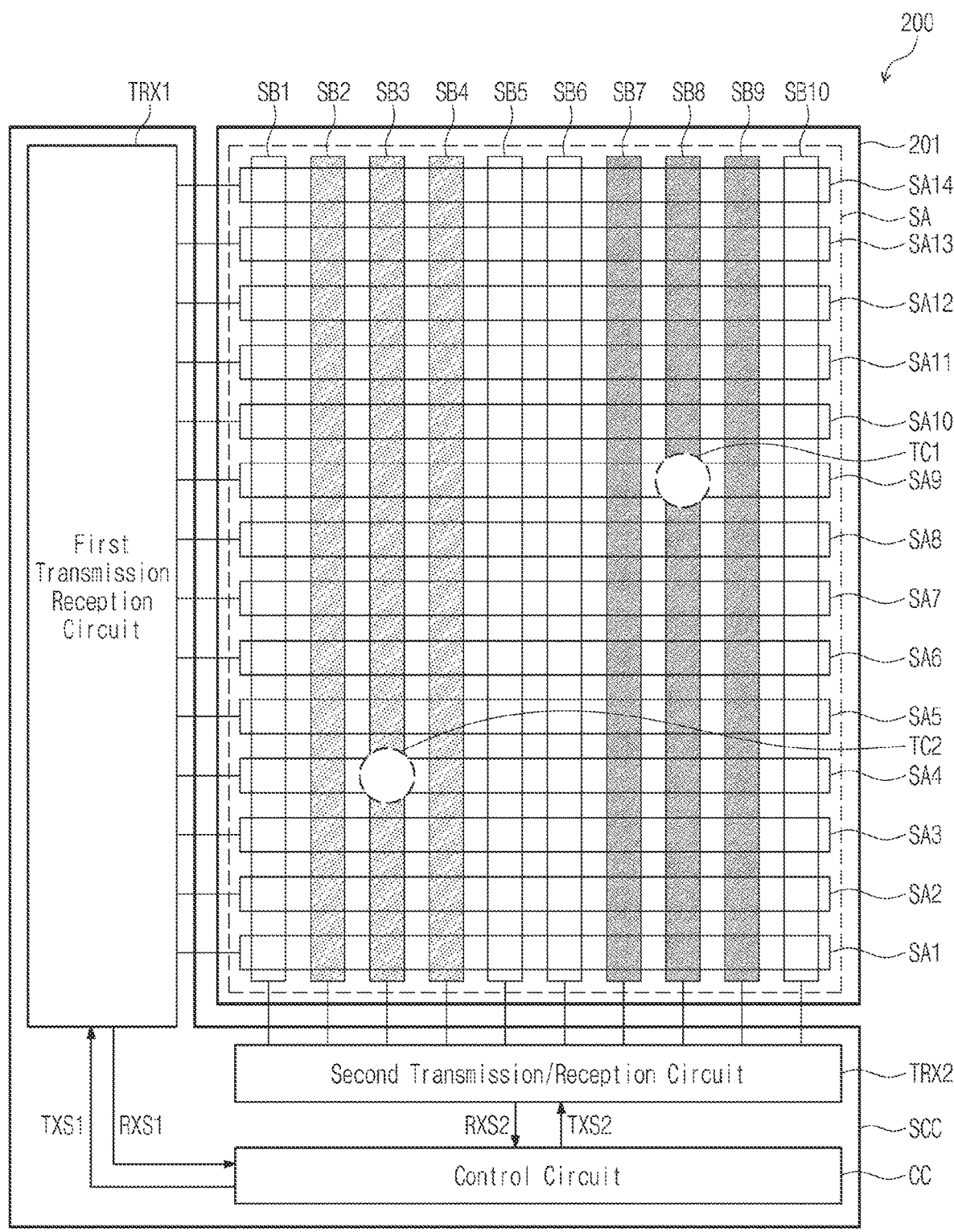

Referring to FIG. 11B, the control circuit CC may provide the second transmission signals TXS2 to the second transmission/reception circuit TRX2 based on the first reception signals RXS1 and the second reception signals RXS2.

The second transmission/reception circuit TRX2 transmits an up-link signal to the second sensing electrodes SB7 to SB9 corresponding to the first contact position TC1 and to the second sensing electrodes SB2 to SB4 corresponding to the second contact position TC2 based on the second transmission signals TXS2 received from the control circuit CC.

The first pen 2000-1 may receive an up-link signal from the second sensing electrodes SB7 to SB9 at the first contact position TC1, and the second pen 2000-2 may receive an up-link signal from the second sensing electrodes SB2 to SB4 at the second contact position TC2. The up-link signal transmitted to the first pen 2000-1 through the second sensing electrodes SB7 to SB9, and the up-link signal transmitted to the second pen 2000-2 through the second sensing electrodes SB2 to SB4, may be different from each other.

FIG. 11B illustrates that three first sensing electrodes among the first sensing electrodes SA1 to SA14 and three second sensing electrodes among the second sensing electrodes SB1 to SB10 transmit an up-link signal. However, embodiments of the inventive concept are not limited thereto. One or more first sensing electrodes adjacent to the first contact position TC1 among the first sensing electrodes SA1 to SA14 and one or more second sensing electrodes adjacent to the first contact position TC1 among the second sensing electrodes SB1 to SB10 may transmit an up-link signal. In an embodiment, two or more first sensing electrodes and two or more second sensing electrodes may transmit an up-link signal, which may efficiently transmit up-link signals to the first pen 2000-1 and to the second pen 2000-2.

Figure 12A:
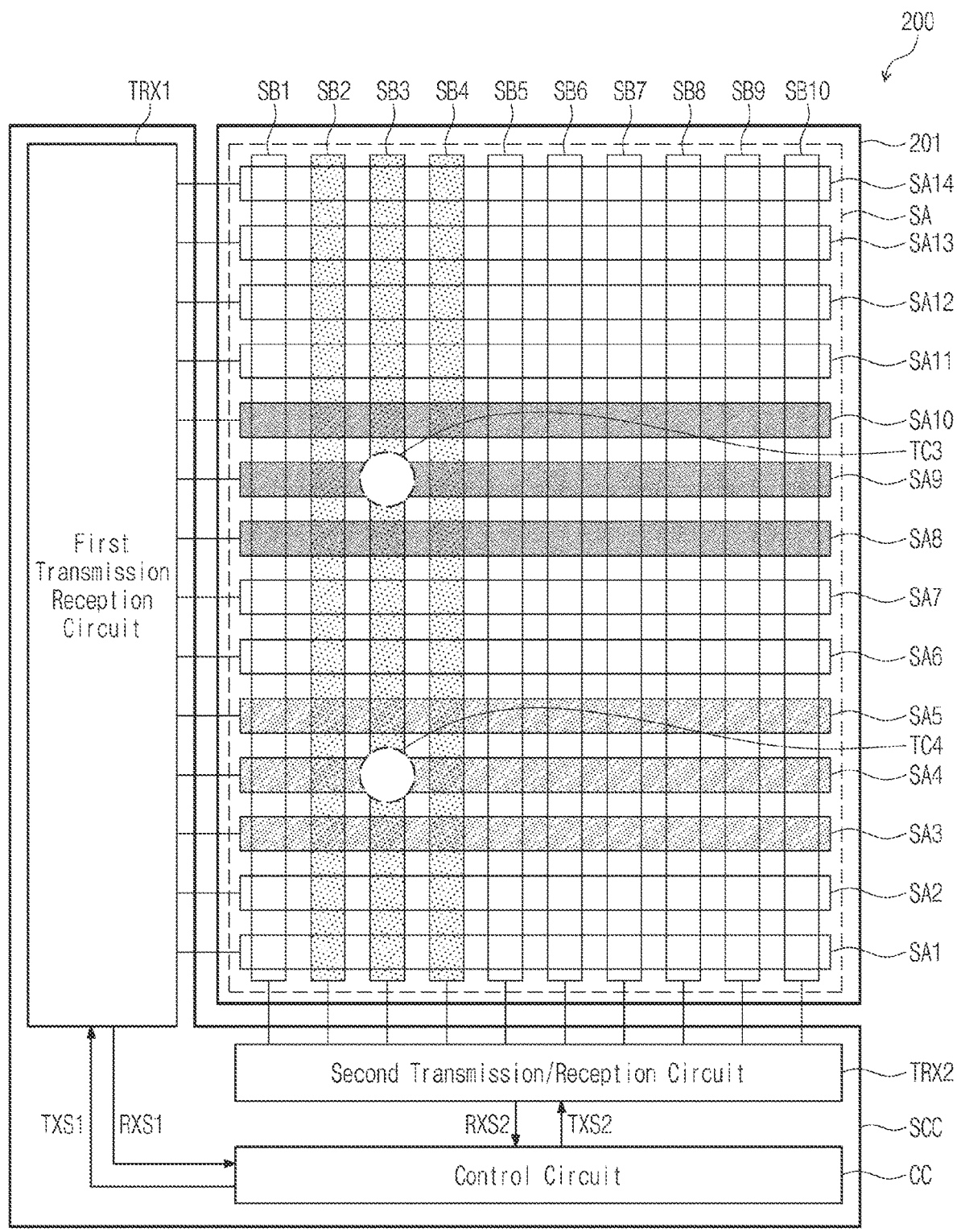

As illustrated in FIG. 12A, when the first pen 2000-1 comes in contact with the input sensor 200, the first transmission/reception circuit TRX1 receives a down-link signal corresponding to a third contact position TC3 from the first sensing electrodes SA8 to SA10. When the second pen 2000-2 comes in contact with the input sensor 200, the first transmission/reception circuit TRX1 may receive a down-link signal corresponding to a fourth contact position TC4 from the first sensing electrodes SA3 to SA5. The down-link signal corresponding to the third contact position TC3 and the down-link signal corresponding to the fourth contact position TC4 may be provided to the first transmission/reception circuit TRX1 substantially simultaneously.

The second transmission/reception circuit TRX2 may receive down-link signals corresponding to the third contact position TC3 and the fourth contact position TC4 from the second sensing electrodes SB2 to SB4. That is, the second sensing electrodes SB2 to SB4 may receive a down-link signal from the first pen 2000-1 and the second pen 2000-2 substantially simultaneously.

The first transmission/reception circuit TRX1 provides down-link signals received from the first sensing electrodes SA8 to SA10 and from the first sensing electrodes SA3 to SA5 to the control circuit CC as the first reception signals RXS1. The second transmission/reception circuit TRX2 provides down-link signals received from the second sensing electrodes SB2 to SB4 to the control circuit CC as second reception signals RXS2.

The control circuit CC may determine the third contact position TC3 and the fourth contact position TC4 based on the first reception signals RXS1 and the second reception signals RXS2, and may provide information on the third contact position TC3 and the fourth contact position TC4 to the main controller MC illustrated in FIG. 2.

Figure 12B:
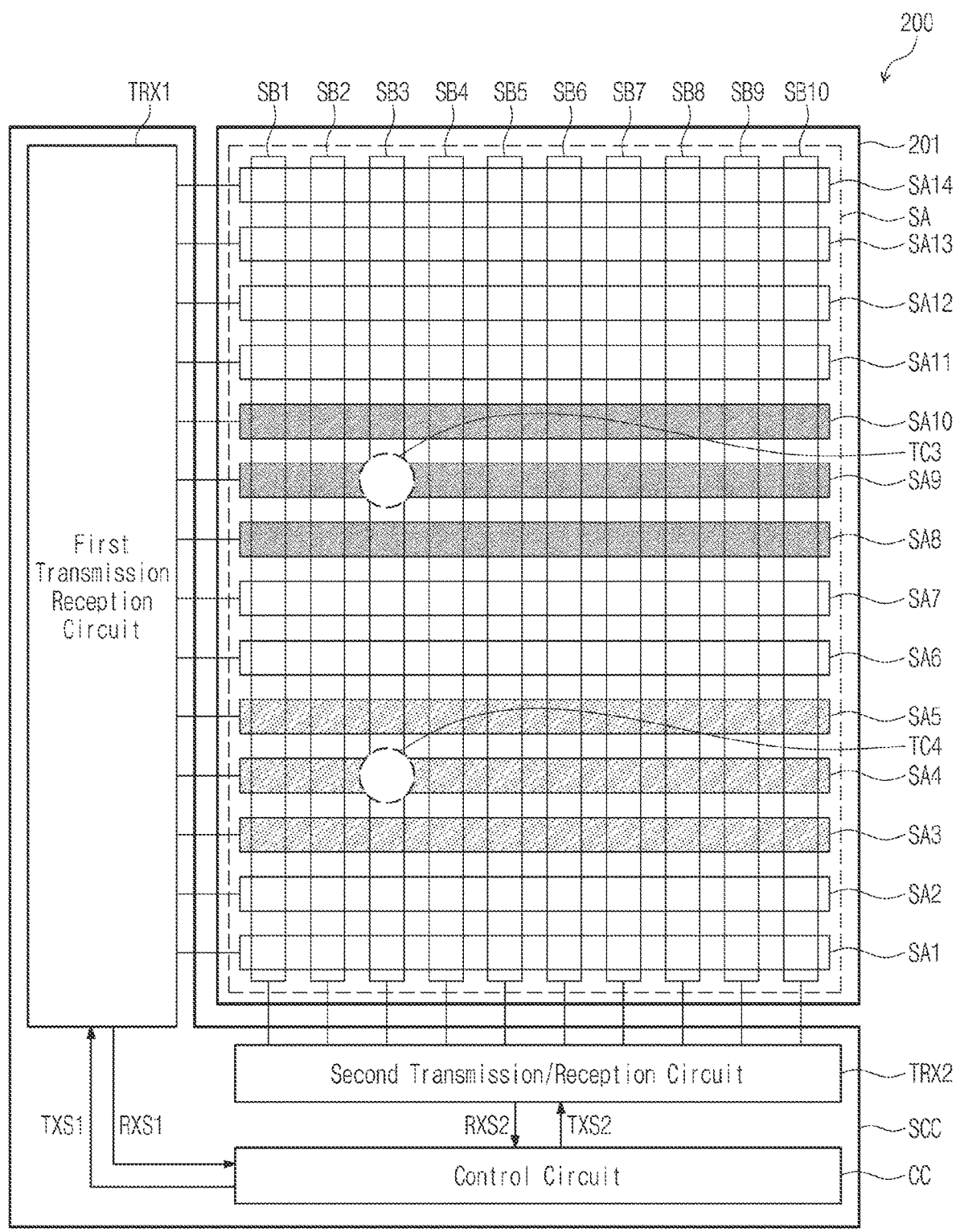

Referring to FIG. 12B, the control circuit CC may provide the first transmission signals TXS1 to the first transmission/reception circuit TRX1 based on the first reception signals RXS1 and the second reception signals RXS2.

The first transmission/reception circuit TRX1 transmits an up-link signal to the first sensing electrodes SA8 to SA10 corresponding to the third contact position TC3 and to the first sensing electrodes SA3 to SA5 corresponding to the fourth contact position TC4 based on the first transmission signals TXS1 received from the control circuit CC.

The first pen 2000-1 may receive an up-link signal from the first sensing electrodes SA8 to SA10 at the third contact position TC3, and the second pen 2000-2 may receive an up-link signal from the first sensing electrodes SA3 to SA5 at the fourth contact position TC4.

As illustrated in FIGS. 12A and 12B, when the third contact position TC3 and the fourth contact position TC4 correspond to the same second sensing electrodes (for example, the second sensing electrodes SB2 to SB4) among the second sensing electrodes SB1 to SB10, the sensor controller SCC operates such that an up-link signal is transmitted through first sensing electrodes.

Therefore, even when the third contact position TC3 and the fourth contact position TC4 correspond to the same second sensing electrodes among the second sensing electrodes SB1 to SB10, the display device DD may transmit an up-link signal to each of the first pen 2000-1 and the second pen 2000-2.

As illustrated in FIGS. 11A and 11B above, even when the first sensing electrodes SA8 to SA10 corresponding to the first contact position TC1 and the first sensing electrodes SA3 to SA5 corresponding to the second contact position TC2 are separated from each other, and the second sensing electrodes SB7 to SB9 corresponding to the first contact position TC1 and the second sensing electrodes SB2 to SB4 corresponding to the second contact position TC2 are separated from each other, a down-link signal from the first pen 2000-1 and a down-link signal from the second pen 2000-2 may act as noise to each other. In this case, the sensor controller SCC may request at least one of the first pen 2000-1 and the second pen 2000-2 to change the frequency band of a down-link signal using an up-link signal.

When receiving a frequency band change request, the first pen 2000-1 and the second pen 2000-2 changes the frequency band of a down-link signal.

When the frequencies of down-link signals transmitted from the first pen 2000-1 and the second pen 2000-2 to the input sensor 200 are different from each other, signal interference between the down-link signals may be minimized or reduced.

The sensor controller SCC may distinguish a down-link signal received from the first pen 2000-1 from a down-link signal received from the second pen 2000-1 according to the frequency band of signals received from the first sensing electrodes SA1 to SA14 and from the second sensing electrodes SB1 to SB10.

As described above with reference to FIGS. 11A, 11B, 12A and 12B, the sensor controller SCC may receive a first signal (or a down-link signal) from the input sensor 200 during a first period (or a down-link period), and may transmit a second signal (or an up-link signal) to the input sensor 200 during a second period (or an up-link period). In an embodiment, the first signal may include a plurality of down-link signals from first sensing electrodes corresponding to a first input position (or first contact position) and a second input position (or second contact position) among the plurality of first sensing electrodes SA1 to SA14, and a plurality of down-link signals from second sensing electrodes corresponding to the first input position (or the first contact position) and the second input position (or the second contact position) among the plurality of second sensing electrodes SB1 to SB10.

Also as described above, in an embodiment, the second signal includes an up-link signal to be transmitted to a second sensing electrode corresponding to the first input position (or first contact position) among the plurality of second sensing electrodes SB1 to SB10 and an up-link signal to be transmitted to a second sensing electrode corresponding to the second input position (or second contact position) among the plurality of second sensing electrodes SB1 to SB10. Further, in an embodiment, the sensor controller SCC transmits the second signal to two or more second sensing electrodes corresponding to the first input position (or first contact position) among the plurality of second sensing electrodes SB1 to SB10 and to two or more second sensing electrodes corresponding to the second input position (or second contact position) among the plurality of second sensing electrodes SB1 to SB10.

Also as described above, in an embodiment, the second signal transmitted to the input sensor 200 includes an up-link signal to be transmitted to a first sensing electrode corresponding to the first input position (or first contact position) among the plurality of first sensing electrodes SA1 to SA14 and an up-link signal to be transmitted to a first sensing electrode corresponding to the second input position (or second contact position) among the plurality of first sensing electrodes SA1 to SA14. In an embodiment, second sensing electrodes corresponding to the first input position (or first contact position) among the plurality of second sensing electrodes SB1 to SB10 and second sensing electrodes corresponding to the second input position (or second contact position) among the plurality of second sensing electrodes SB1 to SB10 overlap each other. In an embodiment, the sensor controller SCC transmits the second signal to two or more first sensing electrodes corresponding to the first input position (or first contact position) among the plurality of first sensing electrodes SA1 to SA14 and to two or more first sensing electrodes corresponding to the second input position (or second contact position) among the plurality of first sensing electrodes SA1 to SA14.

FIGS. 13A and 13B are conceptual views of a pen sensing mode according to an embodiment of the inventive concept.

Referring to FIGS. 10, 11A, 11B and 13A, during the pen sensing mode, the sensor controller SCC may receive down-link signals from the first pen 2000-1 and/or the second pen 2000-2 through the input sensor 200, and may transmit up-link signals to the first pen 2000-1 and/or the second pen 2000-2 through the input sensor 200.

In each of successive frames F1, F2, and F3, the control circuit CC in the sensor controller SCC may receive reception signals RXS from the first transmission/reception circuit TRX1 and the second transmission/reception circuit TRX2, and may transmit transmission signals TXS to the first transmission/reception circuit TRX1 and the second transmission/reception circuit TRX2. The reception signals RXS may include the first reception signals RXS1 received from the first transmission/reception circuit TRX1 and the second reception signals RXS2 received from the second transmission/reception circuit TRX2. The transmission signals TXS may include the first transmission signals TXS1 received from the first transmission/reception circuit TRX1 and the second transmission signals TXS2 received from the second transmission/reception circuit TRX2.

That is, each of the frames F1, F2, and F3 may include a down-link period and an up-link period. For example, a frame F1 may include a down-link period DNP1 and an up-link period UPP1. A frame F2 may include a down-link period DNP2 and an up-link period UPP2. A frame F3 may include a down-link period DNP3 and an up-link period UPP3. The duration of each of the down-link periods DNP1, DNP2, and DNP3 may be longer than the duration of each of the up-link periods UPP1, UPP2, and UPP3.

Referring to FIGS. 10, 11A, 11B and 13B, in the frame F1, the control circuit CC in the sensor controller SCC may receive the reception signals RXS from the first transmission/reception circuit TRX1 and the second transmission/reception circuit TRX2, and may transmit the transmission signals TXS to the first transmission/reception circuit TRX1 and the second transmission/reception circuit TRX2. The reception signals RXS may include the first reception signals RXS1 received from the first transmission/reception circuit TRX1 and the second reception signals RXS2 received from the second transmission/reception circuit TRX2. The transmission signals TXS may include the first transmission signals TXS1 received from the first transmission/reception circuit TRX1 and the second transmission signals TXS2 received from the second transmission/reception circuit TRX2.

The control circuit CC receives the reception signals RXS from the first transmission/reception circuit TRX1 and from the second transmission/reception circuit TRX2 in each of frames F2 and F3. Unlike the frame F1, each of the frames F2 and F3 does not transmit the transmission signals TXS to the first transmission/reception circuit TRX1 and to the second transmission/reception circuit TRX2.

That is, the frame F1 may include a down-link period and an up-link period. For example, the frame F1 may include the down-link period DNP1 and the up-link period UPP1. The duration of the down-link period DNP1 may be longer than the duration of the up-link period UPP1. The frame F2 may include only the down-link period DNP2. The frame F3 may include only the down-link period DNP3.

The frame F1 including the up-link period UPP1 and the frames F2 and F3 not including the up-link period UPP1 may be repeated at regular periods.

For example, as illustrated in FIG. 11A, when the first contact position TC1 is repeated in the second sensing electrodes SB7 to SB9, the transmission of an up-link signal through the second sensing electrodes SB7 to SB9 may be unnecessary. In this case, the control circuit CC may minimize or reduce the frame F1, and may increase the number of repetitions of the frames F2 and F3.

In general, an up-link signal transmitted to the first pen 2000-1 and/or the second pen 2000-2 through the input sensor 200 in the up-link period UPP1 causes interference with an image signal provided to the display panel 100, which may result in display quality degradation.

As illustrated in FIG. 13B, by reducing the up-link period UPP1, it is possible to reduce the display quality degradation of an image displayed in the display panel 100.

A display device having the above configuration may sense inputs from a plurality of input devices substantially simultaneously thereby, increasing user convenience.

While the present inventive concept has been particularly shown and described with reference to the embodiments thereof, it will be understood by those of ordinary skill in the art that various changes in form and detail may be made therein without departing from the spirit and scope of the present inventive concept as defined by the following claims.

What is claimed is:

1. A display device, comprising:
   a display panel;
   an input sensor disposed on the display panel and comprising a plurality of first sensing electrodes and a plurality of second sensing electrodes insulated from the plurality of first sensing electrodes; and
   a sensor controller configured to control the input sensor, wherein
   the sensor controller receives a first signal from the input sensor and transmits a second signal to the input sensor,
   the first signal includes a first plurality of down-link signals from first sensing electrodes corresponding to a first input position and a second input position among the plurality of first sensing electrodes and a second plurality of down-link signals from second sensing electrodes corresponding to the first input position and the second input position among the plurality of second sensing electrodes,
   the second signal comprises a first up-link signal corresponding to the first input position and a second up-link signal corresponding to the second input position,
   the first input position, which corresponds to a first input applied by a first input source, and the second input position, which corresponds to a second input applied by a second input source, are spaced apart from each other on the input sensor, and
   when a second sensing electrode corresponding to the first input position among the plurality of second sensing electrodes and a second sensing electrode corresponding to the second input position among the plurality of second sensing electrodes overlap each other, the sensor controller transmits the first up-link signal to a first sensing electrode corresponding to the first input position among the plurality of first sensing electrodes and transmits the second up-link signal to a first sensing electrode corresponding to the second input position among the plurality of first sensing electrodes.

2. The display device of claim 1, wherein when the second sensing electrode corresponding to the first input position is different from the second sensing electrode corresponding to the second input position, the sensor controller transmits the first up-link signal to the second sensing electrode corresponding to the first input position and transmits the second up-link signal to the second sensing electrode corresponding to the second input position.

3. The display device of claim 1, wherein the sensor controller transmits the second signal to two or more second sensing electrodes corresponding to the first input position among the plurality of second sensing electrodes and to two or more second sensing electrodes corresponding to the second input position among the plurality of second sensing electrodes.

4. The display device of claim 1, wherein the second signal transmitted to the input sensor comprises a first up-link signal to be transmitted to a first sensing electrode corresponding to the first input position among the plurality of first sensing electrodes and a second up-link signal to be transmitted to a first sensing electrode corresponding to the second input position among the plurality of first sensing electrodes.

5. The display device of claim 4, wherein the sensor controller transmits the second signal to two or more first sensing electrodes corresponding to the first input position among the plurality of first sensing electrodes and to two or more first sensing electrodes corresponding to the second input position among the plurality of first sensing electrodes.

6. The display device of claim 1, wherein
   the sensor controller receives the first signal from the input sensor during a first period, and transmits the second signal to the input sensor during a second period consecutive to the first period,
   the first period is earlier in time than the second period, and
   a duration of the first period is longer than a duration of the second period.

7. The display device of claim 1, wherein the first input applied at the first input position by the first input source and the second input applied at the second input position by the second input source occur substantially simultaneously.

8. The display device of claim 1, wherein the second signal transmitted to the input sensor comprises a signal that requests a change in a frequency of at least one of the first input source and the second input source.

9. The display device of claim 1, wherein the sensor controller comprises:
a first transmission/reception circuit electrically connected to the plurality of first sensing electrodes;
a second transmission/reception circuit electrically connected to the plurality of second sensing electrodes; and
a control circuit configured to control the first transmission/reception circuit and the second transmission/reception circuit.

10. The display device of claim 9, wherein
the first transmission/reception circuit provides the first plurality of down-link signals from the first sensing electrodes corresponding to the first input position and the second input position among the plurality of first sensing electrodes to the control circuit, and
the second transmission/reception circuit provides the second plurality of down-link signals from the second sensing electrodes corresponding to the first input position and the second input position among the plurality of second sensing electrodes to the control circuit.

11. A display device comprising:
a display panel;
an input sensor disposed on the display panel and comprising a plurality of first sensing electrodes and a plurality of second sensing electrodes insulated from the plurality of first sensing electrodes; and
a sensor controller configured to control the input sensor, wherein,
the sensor controller receives a first signal from the input sensor during a down-link period of a first frame, and transmits a second signal to the input sensor during an up-link period of the first frame,
the sensor controller receives the first signal from the input sensor during a second frame consecutive to the first frame,
the first signal includes a first plurality of down-link signals from first sensing electrodes corresponding to a first input position and a second input position among the plurality of first sensing electrodes and a second plurality of down-link signals from second sensing electrodes corresponding to the first input position and the second input position among the plurality of second sensing electrodes,
the second signal comprises a first up-link signal corresponding to the first input position and a second up-link signal corresponding to the second input position,
the first input position, which corresponds to a first input applied by a first input source, and the second input position, which corresponds to a second input applied by a second input source, are spaced apart from each other on the input sensor, and
when a second sensing electrode corresponding to the first input position among the plurality of second sensing electrodes and a second sensing electrode corresponding to the second input position among the plurality of second sensing electrodes overlap each other, the sensor controller transmits the first up-link signal to a first sensing electrode corresponding to the first input position among the plurality of first sensing electrodes and transmits the second up-link signal to a first sensing electrode corresponding to the second input position among the plurality of first sensing electrodes.

12. The display device of claim 11, wherein when the second sensing electrode corresponding to the first input position is different from the second sensing electrode corresponding to the second input position, the sensor controller transmits the first up-link signal to the second sensing electrode corresponding to the first input position and transmits the second up-link signal to the second sensing electrode corresponding to the second input position.

13. The display device of claim 11, wherein the sensor controller transmits, during the up-link period of the first frame, the second signal to two or more second sensing electrodes corresponding to the first input position among the plurality of second sensing electrodes and to two or more second sensing electrodes corresponding to the second input position among the plurality of second sensing electrodes.

14. The display device of claim 11, wherein the second signal transmitted to the input sensor during the up-link period of the first frame comprises a first up-link signal to be transmitted to a first sensing electrode corresponding to the first input position among the plurality of first sensing electrodes and a second up-link signal to be transmitted to a first sensing electrode corresponding to the second input position among the plurality of first sensing electrodes.

15. The display device of claim 14, wherein the second sensing electrodes corresponding to the first input position among the plurality of second sensing electrodes and the second sensing electrodes corresponding to the second input position among the plurality of second sensing electrodes overlap each other.

16. The display device of claim 14, wherein the sensor controller transmits the second signal to two or more first sensing electrodes corresponding to the first input position among the plurality of first sensing electrodes and to two or more first sensing electrodes corresponding to the second input position among the plurality of first sensing electrodes.

17. The display device of claim 11, wherein:
the down-link period is earlier in time than the up-link period; and
a duration of the down-link period is longer than a duration of the up-link period.

18. The display device of claim 11, wherein the second signal transmitted to the input sensor during the up-link period of the first frame comprises a signal that requests a change in a frequency of at least one of the first input source and the second input source.

19. The display device of claim 11, wherein the sensor controller comprises:
a first transmission/reception circuit electrically connected to the first sensing electrodes;
a second transmission/reception circuit electrically connected to the second sensing electrodes; and
a control circuit configured to control the first transmission/reception circuit and the second transmission/reception circuit.

* * * * *